United States Patent
Elfman

(10) Patent No.: US 11,205,916 B2
(45) Date of Patent: Dec. 21, 2021

(54) HIGH-ENERGY CAPACITIVE TRANSFORM DEVICE USING MULTIFILAR INDUCTOR

(71) Applicant: Richard H. Sherratt and Susan B. Sherratt Trust Fund, Alameda, CA (US)

(72) Inventor: Brian Elfman, Alameda, CA (US)

(73) Assignee: Richard H. Sherratt and Susan B. Sherratt Revocable Trust Fund, Alameda, CA (US)

( * ) Notice: Subject to any disclaimer, the term of this patent is extended or adjusted under 35 U.S.C. 154(b) by 0 days.

(21) Appl. No.: 17/256,148

(22) PCT Filed: Mar. 20, 2020

(86) PCT No.: PCT/US2020/024033
§ 371 (c)(1),
(2) Date: Dec. 24, 2020

(87) PCT Pub. No.: WO2020/191367
PCT Pub. Date: Sep. 24, 2020

(65) Prior Publication Data
US 2021/0313826 A1    Oct. 7, 2021

Related U.S. Application Data

(60) Provisional application No. 62/821,386, filed on Mar. 20, 2019.

(51) Int. Cl.
*H02J 7/34*          (2006.01)
*B60L 53/60*         (2019.01)
(Continued)

(52) U.S. Cl.
CPC .............. *H02J 7/342* (2020.01); *B60L 50/40* (2019.02); *B60L 53/55* (2019.02); *B60L 53/60* (2019.02);
(Continued)

(58) Field of Classification Search
CPC .... H02J 7/14; H02J 7/342; H02J 7/345; H02J 2207/50; B60L 50/40; B60L 53/55; B60L 53/60
See application file for complete search history.

(56) References Cited

U.S. PATENT DOCUMENTS 9,287,701 B2   3/2016 Elfman
9,713,993 B2   7/2017 Elfman
(Continued)

*Primary Examiner* — Richard Isla
*Assistant Examiner* — Johali A Torres Ruiz
(74) *Attorney, Agent, or Firm* — Staniford Tomita LLP

(57) ABSTRACT

A system comprising a high voltage (HV) bank section using capacitors arranged into two banks, a multifilar inductor coupling the HV bank to a service voltage (SV) bank section and load through a charging circuit charging the SV bank from a more fully charged bank until the charging bank is depleted, and a switch switching, from the depleted bank to the other bank of bank to charge the SV bank. The charging circuit then charging the depleted bank by a power supply as the other HV bank charges the SV bank. A supervisory controller controls the switch to repeat switching and charging between the two banks for a defined period. The capacitors may be supercapacitors having a capacitance on the order of 1 to 10 MegaJoules.

20 Claims, 17 Drawing Sheets

(51) Int. Cl.
  *B60L 50/40* (2019.01)
  *H02J 7/14* (2006.01)
  *B60L 53/55* (2019.01)

(52) U.S. Cl.
  CPC ................. *H02J 7/14* (2013.01); *H02J 7/345* (2013.01); *H02J 2207/50* (2020.01)

(56) References Cited

U.S. PATENT DOCUMENTS

| | | | |
|---|---|---|---|
| 10,814,806 B1 | 10/2020 | Elfman | |
| 2009/0096285 A1* | 4/2009 | Acena | B60L 50/40 307/10.1 |
| 2011/0204959 A1* | 8/2011 | Sousa | H02M 3/07 327/536 |
| 2012/0091731 A1* | 4/2012 | Nelson | B60L 58/22 290/1 R |
| 2015/0129755 A1* | 5/2015 | Hiley | H01F 27/255 250/281 |
| 2017/0117720 A1* | 4/2017 | Yung | H02J 7/0047 |
| 2017/0366017 A1* | 12/2017 | Clay | H02J 7/342 |

* cited by examiner

| Contact | -1 | -2 |
|---|---|---|
| S2A1 | Charge | Bank |
| S2A2 | Bank | Charge |
| S2B1 | Charge | Bank |
| S2B2 | Bank | Charge |
| S3A1 | Genset | Open |
| S3A2 | Genset | Open |
| S3B1 | Genset | Open |
| S3B2 | Genset | Open |

FIG. 9A

| Switch Charging Section | | |
|---|---|---|
| A1 | S2A1-1 | S3A1-1 |
| A2 | S2A2-2 | S3A2-1 |
| B1 | S2B1-1 | S3B1-1 |
| B2 | S2B2-2 | S3B2-1 |

FIG. 9B

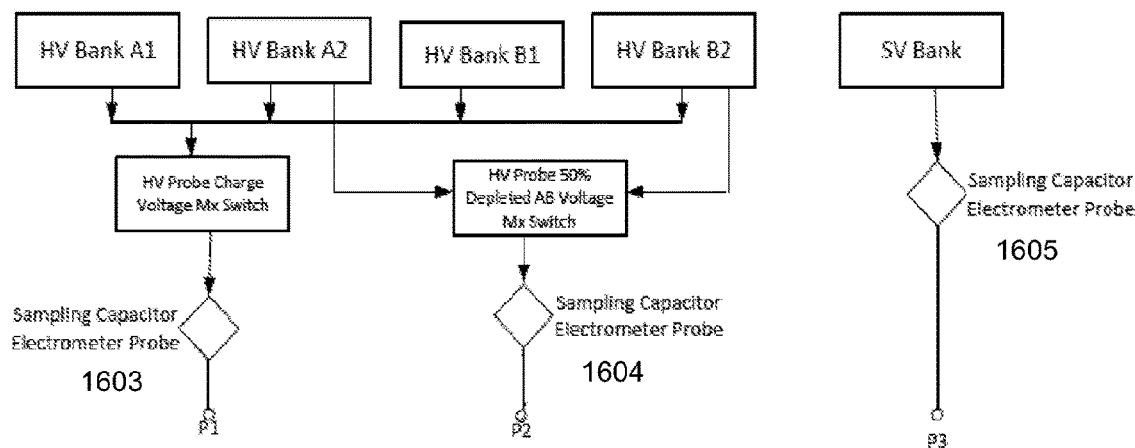
  
FIG. 16

TABLE 1

| Probe | Assignment | Reference DAC | Function |
|---|---|---|---|
| P1 | Mux:HV Banks A1, A2, B1, B2 | DR-1 | Signals HV full charge at 250V |
| P2 | Mux: HV A Bank; B Bank | DR-2 | Signals HV Depletiton at 250V |
| P3 | Mux: SV Bank Charge | See Next line | Controls S1 turn-off |
| P3 | DR-3A through DR-3H | | See Table 2 |

TABLE 2

| DAC REFERENCE CIRCUIT | REFERENCE VOLTAGE/NOTES |
|---|---|
| DR-3A | 114V These voltages are approx. Actually V set at Calibration |
| DR-3B | 115V |
| DR-3C | 116V |
| DR-3D | 117V |
| DR-3E | 118V |
| DR-3F | 119V |
| DR-3G/DR-3H | 120V DR-3H monitors 121V (or higher) |

FIG. 18

HIGH-ENERGY CAPACITIVE TRANSFORM DEVICE USING MULTIFILAR INDUCTOR

CROSS-REFERENCE TO RELATED APPLICATIONS

This application claims priority to U.S. Provisional Patent Application 62/821,386, filed on Mar. 20, 2019 and entitled "High-Energy Capacitive Transform Device Using Multifilar Inductor."

TECHNICAL FIELD

Embodiments are generally directed to energy transfer circuits, and more specifically to intelligently switching capacitive energy into an inductor to transform high levels of energy to useful voltages.

BACKGROUND

Certain types of battery chemistries are often used to store the energy produced by generator sets (gensets) and other power generation devices. Unlike these rechargeable batteries, other types of batteries cannot be recharged. Common to both types of batteries is the fact that battery voltages have a relatively flat discharge curve from fully charged to mostly discharged, which defines its 'useful charge'. In other words, over its useful energy range, battery voltages may decrease by only a few percent. This relatively flat discharge curve defines a battery's usefulness to drive a load. For these reasons, battery output voltages may commonly be converted up or down to fit various applications, thus leading to commonly used battery voltage converters.

Capacitors are another common type of energy storage device. However, as energy-storage charge-transfer devices, capacitors are subject to an asymptotic energy discharge curve, and all capacitors display this characteristic parameter. For example, a capacitor's discharge curve may drop 50% but discharge 75% of its energy content during a discharge cycle under load. With these differences between battery discharge curves (flat) and capacitor discharge curves (asymptotic), it may be surmised that certain conversion techniques that may work efficiently for batteries may not be as efficient for capacitors.

Batteries are also relatively low voltage energy-storage devices. For example, a present lead-acid battery produces an approximate 1.5V per cell voltage, while a lithium-ion battery may produce just over 3.0V. In either case, to achieve useful common voltages such as 12V, 24V, 48V or the several hundred volts for an electric vehicle or similar application; batteries must be stacked. Thus, to meet high power demands, parallel battery stacks may need to be used.

Capacitors, on the other hand, can store very high voltages. While similar circuit principles apply, the storage voltage of a capacitor is generally limited only by its dielectric breakdown voltage. Accordingly, using a hypothetical 1000 volt, 1.0 Farad capacitor, this capacitor would be able to store $(C \times V^2)/2$ or 500 kJ (kilo-Joules), but it should be noted that the asymptotic discharge curve means that its voltage would decrease down to 500V (50%) in order to extract 375 kJ (75%) of energy. In other words, for capacitors, the higher the energy, the more diverse the voltage decrease; and if battery energy converters were used to convert capacitor voltages, there would be an even less efficient conversion. Therefore, it is not enough to simply design a capacitor energy converter to work across a wide voltage spread, but rather to design an energy converter that will efficiently convert energy into a useful voltage over a wide range of voltages.

Supercapacitors generally embody capacitors with storage values much higher than other capacitors, perhaps on the order of thousands of times more energy per unit volume than electrolytic capacitors, but with lower voltage limits. One advantageous use of supercapacitors is as a high voltage (or 'HV') capacitor bank charged by a diesel (or other fuel type) genset. When the energy is transformed to its service voltage (or 'SC') capacitor bank by way of a high-voltage (HV) capacitor bank, the genset is charging at its most efficient RPM; whereas the service bank feeds its load 0.0 to 100% at approximately the same efficiency. In this manner, the genset is always running at its maximum efficiency, and helps overcome a genset's varying of RPM and related loss of efficiency typically suffered over a range of load conditions. FIG. 1A illustrates the efficiency versus fuel consumption of a typical genset, as currently known. As shown in graph 100 of FIG. 1A, the efficiency curve 102 showing percentage of load (horizontal axis) rises upward against decreasing levels of specific fuel consumption 104.

As presently employed, battery high-power megajoule (MJ) energy conversion systems are generally known in various switching and linear configurations. Examples include 1) switching converters or so-called 'Buck converters,' and 2) transformer-based linear converters. For high energy capacitive energy transforms, switching converters efficiencies are considerably diminished as direct exponentially capacitive descending energy-discharge voltages do not correlate with the generally flat-line discharge voltages in battery systems. Whereas, megajoule-size transform linear circuits incorporating transformer-based systems not only suffer the same aforementioned efficiency defects but, among other things, they often require temperature-controlled large components for these applications. Moreover, in addition to the above noted limitations, both linear and switcher converters require DC to frequency and back to DC transformations in order to operate. These kinds of efficiency-limiting transformations may not appear in the below disclosed embodiments.

Current developments, such as those described in U.S. Pat. Nos. 9,287,701 and 9,713,993 (which are both assigned to the assignee of the present application and incorporated in their entirety herein) have yielded an improved system that minimizes the number of switching needs, such as by eliminating the transformer plus frequency component with a commensurate decrease of electrical losses thereto. Consequently, these solutions minimize the required components comprising an high-voltage capacitor energy storage switch and inductor feeding a service voltage (SV) capacitor bank.

However, it is also known that running high currents across an inductor can result in destructive back EMF and related spurious voltages, and other detrimental effects. Whether configured in grounded (parallel) or ungrounded (series) circuitry, consider an example that switches a modest 50 A at 1.0 H (Henry) across the inductor for a short period of time (e.g., 10 milliseconds). When the switch opens, the current drops sharply 50.0 A to 0.0 A. This sharp decrease of current could equate up to 5000 volts of back EMF. Casting this in differential form yields Equation 1.0:

$$V_{em} = L(-di/dt) \qquad \text{Equation 1.0}$$

It should be noted that this point is predicated on a static hypothetical case. In a more realistic real world context, the dynamic (compared to static) inductance L is a continuously varying quantity and is wholly dependent on the B/H (or B-H) curve versus permeability µ versus current I. This dynamic relationship is illustrated in the diagram of FIG. 1B, which illustrates a B/H curve 120 and permeability curve 118 for different values of flux density 114, permeability 112, and magnetizing force 116. The B/H curve 120 shows the relationship between magnetic flux density (B) 114 and magnetic field strength (H) 116 for a particular material. These values are related to each other through the magnetization M of the material through the relationship: $B=H\mu_m$. Thus, the initial permeability ($\mu_{initial}$) that may be implied in Equation 1.0 is only one of several B/H µ delineations. For example, one reference (McLyman) lists over a dozen such material-sensitive delineations, such as $\mu_\Delta$, incremental permeability; and, $\mu_{max}$, maximum permeability.

In general, to provide efficient transformation of energy, high-energy/high-voltage storage systems require mechanisms to overcome significant detrimental effects from back EMF, thermal loading, and other similar effects. What is needed, therefore, is an energy transformation system that employs advanced capacitor and inductor devices with intelligent monitoring, control, and switching schemes to provide efficient transformation of high levels of generated energy to useful voltages.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 9A shows the genset switch contact assignments used in FIG. 8, under an embodiment.

FIG. 9B shows a table of the charging schedule for FIG. 8, under an embodiment.

FIG. 16 illustrates a supervisory control circuit with electrometer probes, under some embodiments.

FIG. 18 contains Tables 1 and 2 that show certain assignments for the probes of FIGS. 16 and 17, under an embodiment.

DETAILED DESCRIPTION

Figure 1A:
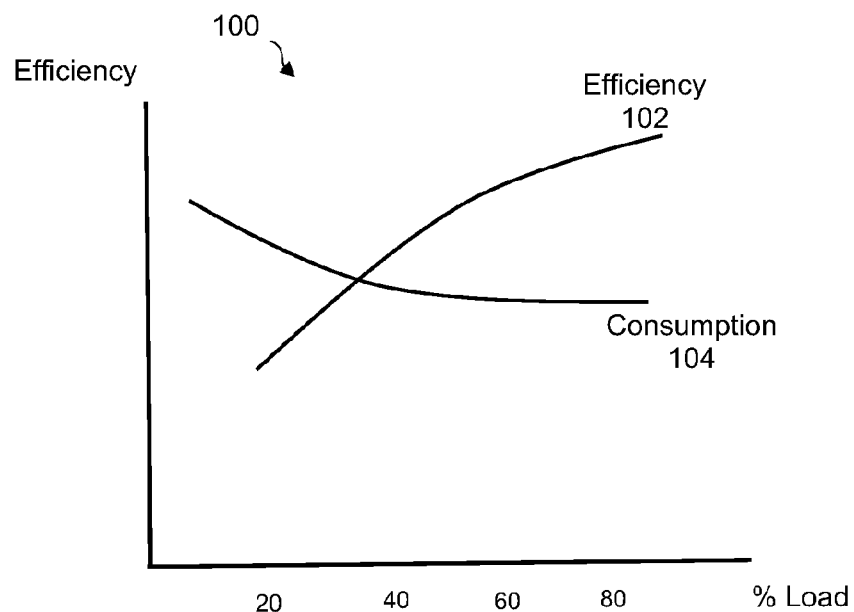
FIG. 1A illustrates the efficiency versus fuel consumption of a typical genset, as currently known.
Figure 1B:
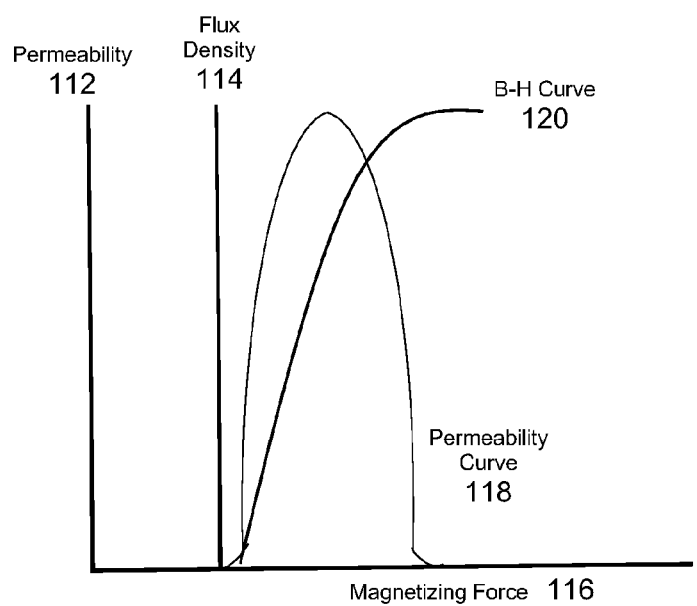
FIG. 1B illustrates a B/H curve and permeability for different values of flux density and magnetizing force.

A detailed description of one or more embodiments is provided below along with accompanying figures that illustrate the principles of the described embodiments. While aspects of inventive technology are described in conjunction with such embodiments, it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device or component within a larger system, a method, or an article of manufacture.

Embodiments are directed to electrical components and circuits that transform electrical energy generated at high energy levels to useful voltages through the use of advanced capacitive and inductive components and intelligent monitoring, controlling, and switching mechanisms. Embodiments are also directed to inductors or inductive circuits with multifilar windings to minimize or defeat destructive effects, such as back EMF and thermal loading. Such an inductor can be used in a genset apparatus comprising a charging circuit coupled to a high voltage (HV) capacitor bank, a switching circuit to switch the high voltage into the inductor, and an output circuit to charge a service voltage (SV) capacitor bank. The SV bank may be active only under load, and a control circuit monitors the SV bank such that the switch operates between certain voltage limits. The inductor may comprise a multifilar wound toroidal inductor that improves effective energy processing.

A genset combines an electrical generator and an engine (or other power supply) to form a single unit. The generator works using the process of electromagnetic induction in which a source moves an electrical conductor in a magnetic field to induce the flow of electric charges by creating a voltage difference between that generates current. The engine may burn fuel, such as diesel, petrol, propane, etc. Gensets can be built to any practical scale and can be designed for different applications, such as providing continuous loads, backup generation, peak shaving, or portable use.

An inductor has many circuit applications. One of these is an energy-storage device. As such, inductors may be constructed in any number of geometries. Some may be a combination of geometries so that more complex inductors may also be constructed, such as multiple coils, multiple cores, or a combination thereof. A core around which the wire is wound may be air or a magnetic material. Inductors can be constructed from micro-scale to mega-scale (e.g., on the order of the size of a building). What determines the size is generally the inductor's voltage versus current functions.

As noted, inductors are multifaceted. The inductor may be wound with multiple wires in various configurations, as opposed to the simple single-coil inductors. Generally, these may be referred to as multifilar windings. Under this nomenclature, a double wire-wound inductor may be called bifilar; a triple wire-wound inductor may be called trifilar; and a four-wire wound inductor may be called quadfilar, and so on.

Another key parameter in an inductor/transformer design is the magnetic flux saturation, $B_{sat}$. (See, e.g., Colonel McLyman, 2011, p. 1-8 et seq. CRC press). In this regard, magnetic material is classified into several media categories, such as ferrite, powder, iron alloys and so forth, each with its typical $B_{sat}$ point. Of these materials ferrite may have among the lowest $B_{sat}$. McLyman further enumerates which magnetic material possess certain parametric advantages compared to other such materials. For example, certain efficient qualities of ferrite may be desirable despite its comparatively lower $B_{sat}$ and Curie temperature. Ferrite may thus possess certain superior parameters, but may have the lowest $B_{sat}$ One possible way to alleviate the low $B_{sat}$ point of ferrite for high currents may be to insert a gap into the magnetic structure. More specifically, certain magnetic structures such as toroidal forms may lend themselves to gap configuration. Thus, in certain implementations, a toroidal ferrite may be the most advantageous configuration.

Another possible design approach may be to employ a multifilar winding. For example, a bifilar relay winding. Which, in addition, helps to alleviate the effect of back EMF. Back EMF generally refers to an induced Electromagnetic Force (EMF) that opposes the direction of current which induced, and is a significant issue with respect to both static and dynamic operation of inductive circuits in high energy applications, such as large-scale gensets. In an embodiment, a bifilar-wound ferrite toroid inductor is used to ameliorate back EMF in certain devices and circuits of the described embodiments. This diminished back-EMF is further enabled by one of the bifilar windings being shorted or connected by snubber circuitry, for the case of either AC or DC excitation.

Certain tests of a bifilar-wound ferrite toroid inductor have also revealed significant companion benefits, as can be seen with respect to ferrite's low saturation point $B_{sat}$.

With high-energy, high-current (i.e., high energy) applications, any magnetic structure must fit within the limits placed by Equation 2.0:

$$H=(0.4\pi NI)/le \qquad \text{Equation 2.0}$$

In Equation 2.0, the left side H in Oersteds (Oe) equates to the source EMF. The right side equates to the relationship between circular size of the toroid le in centimeters divided into the product of the number of windings times the peak current N times I. (Note: the 0.4 π represents a conversion of notation systems). For example, if I=100 A, H could well come out in the 70's of Oe. Here, ferrite saturates at around 15 Oe. Certain testing showed no saturation at what was thought to be a peak current three times the $B_{sat}$ point, but instead, the actual peak current turned out to be inside the $B_{sat}$ point. This effect is due to the SV bank capacitance plus the capacitance added by the bifilar winding.

Figure 2:
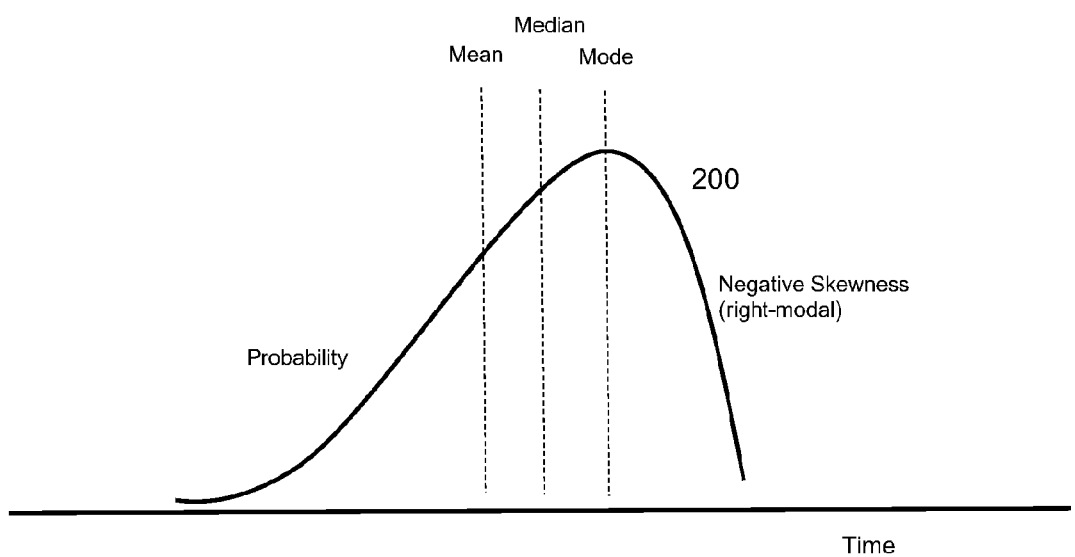
FIG. 2 illustrates an estimated wave shape 200 of the source EMF formed by a bifilar winding inductor, under some embodiments.

FIG. 2 illustrates an estimated wave shape of the source EMF formed by a bifilar winding, under some embodiments. The wave shape of curve 200 is enabled by the SV bank load switch S1, which creates a pulse (or square) wave (typically every few milliseconds). As the current across the bifilar-wound ferrite toroid inductor L1 is zero at S1=T0, it can be seen that the slope formed from X=0 to the first and second (of three) vertical points shown, as labeled "Mean," "Median," and "Mode." As current I starts to flow across L1, it must overcome the various resistances formed by 1) the copper windings, 2) inductive reactance, and 3) sum of the capacitances. The slope of the wave shape 200 represents the vector sum of these components. The principal component being the sum of its capacitances, which mainly (but not exclusively) comprises the SV bank and the additional capacitance created by the bifilar-winding.

The slope of the wave shape of curve 200 is an integration of energy over time that approximates that given in the following Equation 3.0

$$\int_{a}^{bx} f(x)dx \qquad \text{Equation 3.0}$$

Equation 3.0

The peak current of the slope of the wave shape is far less than a hypothetical static computation indicates. The bifilar-wound inductor (L1) thus provides two attributes. First, it alleviates back EMF, and second, when coupled to an SV capacitor bank, it increases the energy transform inside of $B_{sat}$.

Certain tests have also indicated that there is little or no temperature rise during operation of the inductor. To start with, in ferrite copper wire wound toroids, the principal resistance is from the copper wires. Mathematically, the temperature rise equals the current (I) squared times the copper wire resistance multiplied by the time of current across the inductor, all divided by the capacitance. Thus, as shown in Equation 4.0:

$$\Delta T = I^2 T \Delta t / C \qquad \text{Equation 4.0}$$

This suppression of the temperature rise effect is denoted as adiabatic loading. That is, the time of energy transformed is so short so as to not cause thermal dissipation. Thus, in addition to the foregoing two attributes, given ferrite has a relatively low Curie Temperature point; a third and vital attribute of adiabatic loading is provided.

With respect to adiabatic loading, it is known that when charging a capacitive load C through a voltage swing V, a conventional charging circuit using a constant voltage source dissipates energy as given by $E_{diss}=[(I^2R)(\text{Duty Cycle})]$, whereas an ideal adiabatic charging circuit using a constant current source with a resistor R inline with a capacitor C dissipates energy as given by $E_{diss}=I^2Rt=(Q^2R)/t=CV^2((RC)/t)$. Thus, in theory, adiabatic charging improves the energy efficiency of conventional charging by a factor of 0.5 (t/(RC)).

With further respect to adiabatic loading, the effectiveness of certain embodiments of the inductor and the SV bank integration, certain magnetic materials such as ferrites saturate at relatively small currents. In turn, certain magnetic materials such as ferrite virtually generate little or no eddy currents, thus adding to efficiency. In the transform of high energy (e.g., over a megajoule), large currents are required, which is a dichotomy that might seem to prohibit use of such efficient magnetic materials. Yet, going to less efficient magnetic materials would then subject said MegaJoule transformations to significant energy losses. To make this point, a 5% loss (95% efficiency) would mean megajoule level losses. Saturation curves are subject to several factors. For example, a small opening (gap) in a ferrite toroid wound core will extend the saturation curve, thus improving current tolerances. Another one of which may be by the inductor capacitance, such as by transforming the MegaJoule energy source into a capacitor storage bank. Indeed, with a large inductor capacitance, high currents I may be tolerated.

In an example embodiment, a service voltage capacitor bank (SV Bank) is set to a voltage of 117.5 VDC with the charge cycle VDC. That is, it is charged to 126 VDC and then discharged into a load over five seconds. Its then recharges at approximately 114 VDC in several pulses back to 126 VDC. In other words, the SV Bank capacitance is set at a value where its design load, such as in an embodiment that runs five seconds between 126 VDC and 114 VDC, has a pulse train that is set such that each pulse raises the voltage approximately a volt back to 126 VDC. The pulse width will be shortened to a few milliseconds. Thereby effecting a adiabatic loading duty cycle sequel. Notwithstanding the adiabatic loading effect, the foregoing pulse embodiment likewise effects a so-called compressed current, where high current values in the megajoules may be transformed with smaller gauge copper windings. Notwithstanding the foregoing compressed current effect, and most critically importantly the adiabatic loading by a relatively large current I, it flattens the curve below saturation through the entire pulse process. Certain tests have also indicated that there is little or no temperature rise during operation of the inductor. To start with, in ferrite copper wire wound toroidal inductors, the principal resistance is from the copper wires. Mathematically, the temperature rise equals the current (I) squared times the copper wire resistance multiplied by the time of current across the inductor, all divided by the capacitance. Thus, as shown in Equation 4.0 above: $\Delta T=I^2T\Delta t/C$. This equation describes the relationship between a source limited by a capacitance, and the temperature rise effect is consequential to adiabatic loading.

High-Energy Capacitive Conversion System

Embodiments include a high-voltage, high-energy capacitive conversion system incorporating a bifilar or multifilar-wound ferrite toroid inductor that reduces back EMF, provides high-current integration, and reduces adiabatic loading problems to enable a more efficient conversion from a high-energy, high voltage capacitor system to a useful voltage through a service voltage capacitor bank. Details regarding the composition and properties of the inductor are provided later in this description with respect to FIGS. 12 to 15.

Figure 3:
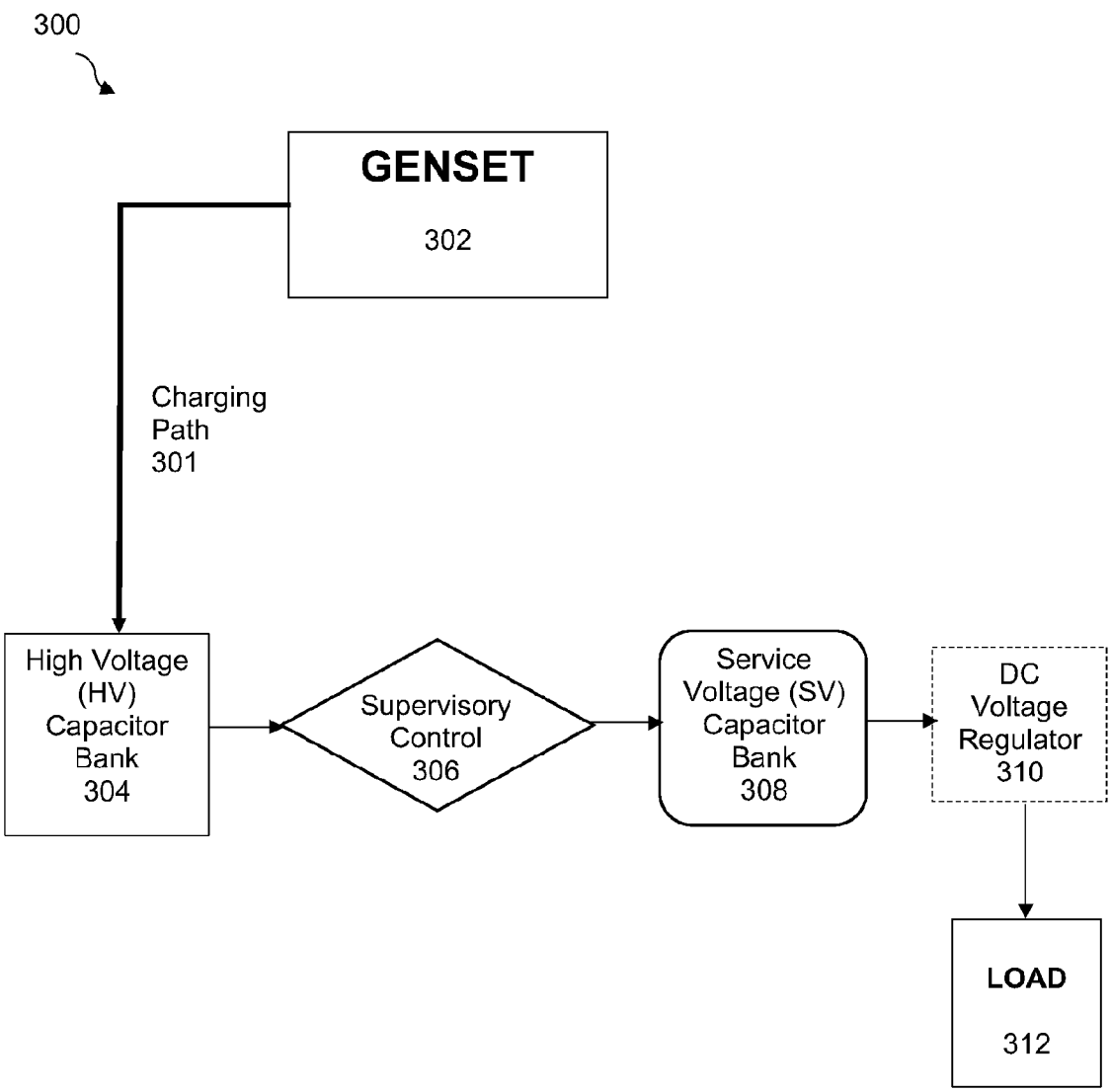
FIG. 3 is an overall diagram of a high-voltage charging system that uses a capacitive storage system, under some embodiments.

The capacitive conversion system that includes this inductor may be referred to as a MegaJoule (MJ) system and represents a power converter utility solution that efficiently transforms energy from a high-voltage capacitor system. It provides significant advantages over known prior art systems that use batteries and employ switching converters, such as Buck converters. As described above, these systems have drawbacks that are overcome by the capacitive conversion system, which is capable of metering large amounts of energy from a high-voltage storage side to a load-driver linear service voltage FIG. 3 is an overall diagram of a high-voltage charging system that uses a capacitive storage system, under some embodiments. The overall system 300 includes a charging system for high voltage capacitor bank 304, which may comprise two banks, A and B. Embodiments are configured to work with gensets, but any source of EMF may be used.

The HV bank 304 is charged by a genset 302 over charging path 301. The genset 302 may be any appropriate internal combustion engine (ICE) plus generator, such as powered by diesel, petrol, propane, natural gas, and so on, and may be normally aspirated or forced induction (e.g., turbo or supercharged). It may also be implemented by any other feasible power source, such as fuel cells or batteries. The genset can even be a simple line voltage (e.g., 115 VAC) power supply capable of charging the HV banks A and B. The genset 302 and HV capacitor bank 304 should be configured and paired so that bank 304 can be charged in a relatively short period of time, i.e., on the order of seconds rather than minutes or hours.

In an embodiment, the HV bank 304 is based on supercapacitors having a capacitance on the order of 1 to 10 MegaJoules, however embodiments are not so limited. Any appropriate capacitor for the application and scale of installation may be used including electrolytic capacitors, and so on. Other capacitors that may be developed, such as ceramic capacitors are also possible. In an embodiment, the HV bank is divided into two banks (A and B), where each bank may contain, for example, 180 EA stacked 4000 F×2.85V supercapacitor cells. In an example implementation, this arrangement yields, fully charge, 510V at 22.22 F for a capacitance of 3 MJ. At depletion (50% voltage, 250V) roughly 75% (or 2.1 MJ) of the energy is transformed out of the HV bank. At this point (approximately 250V), the current HV bank (A or B) begins to charge and the load is switched to the other bank (B or A). The values given above are for example only, and embodiments are not so limited. Any appropriate configuration, size, composition, and capacitance of the HV bank may be used depending on application requirements and constraints.

As shown in system 300, the HV capacitor bank 304 is coupled to a service voltage (SV) capacitor bank 308 through a supervisory control (SC) circuit 306. The SC circuit 306 is an electronic control module that controls the switching within the system and routes signals among the components. In an embodiment, the switching is controlled by a pulse generator and the SC unit may include one or more processors to provide programmable control over the switching.

In an embodiment, the SV bank also comprises supercapacitors similar to those of the HV bank. However, only one bank of capacitors is generally provided for the SV bank. Alternatively, any type of capacitor or set/array of capacitors may be used for the SV bank depending upon the output voltages required and the load levels.

In general, a switch refers to any one or more of the following: a mechanical switch, a solid-state switch, and/or a merged solid-state and mechanical switch. As used herein a switch includes a first and a second terminal and a control terminal. When the control terminal is in a closed state, the first and second terminals are connected, or closed. When the control terminal is in an open state, the first and second terminals are open, or unconnected.

A discharge side of the SV capacitor bank 308 drives a load 312. An optional DC voltage regulator 310 may be provided. Such a component may include a DC-to-AC inverter to drive the load.

Figure 4:
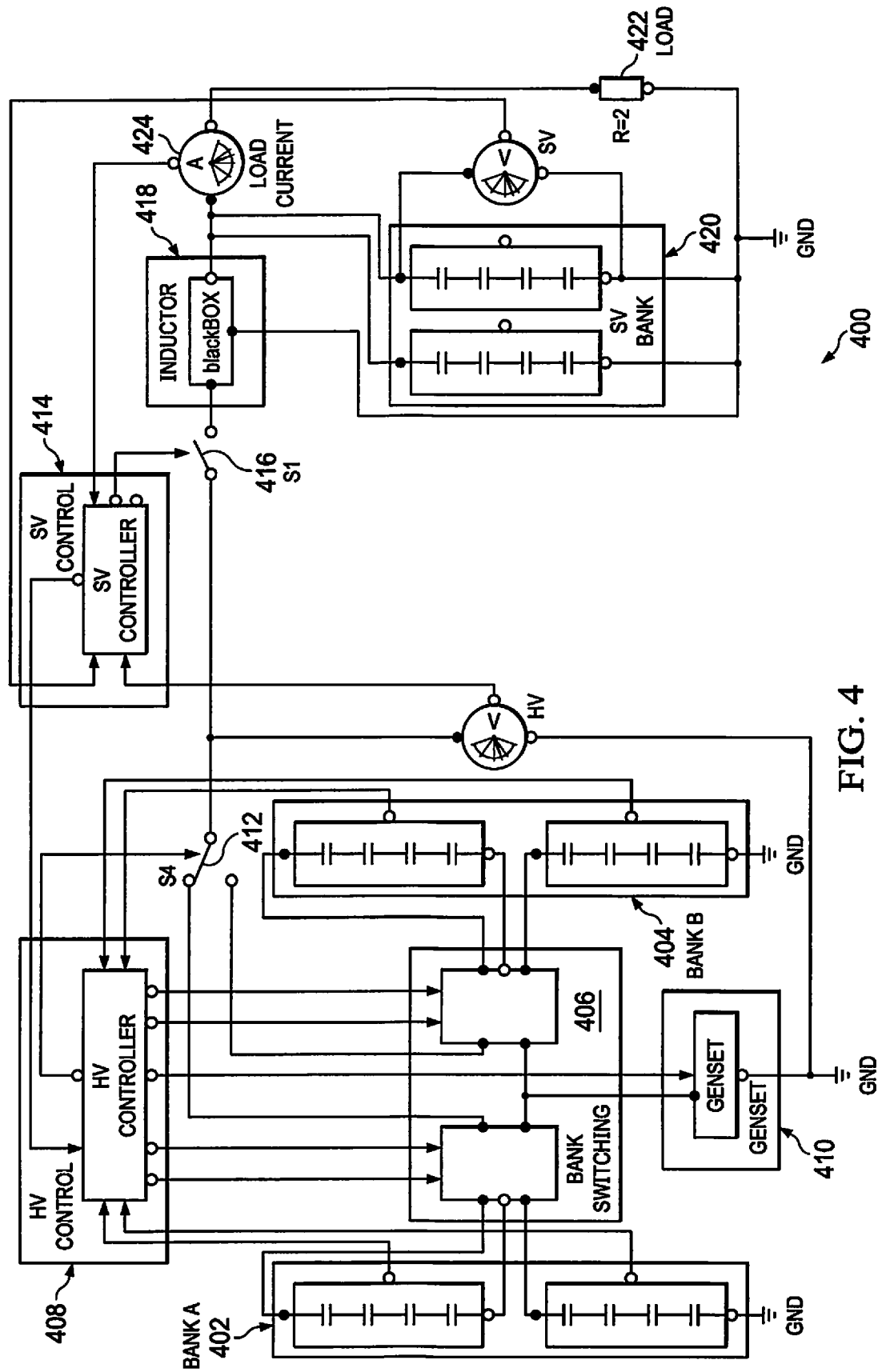
FIG. 4 illustrates a high-voltage, high-energy capacitive conversion system incorporating a bifilar or multifilar-wound ferrite toroid inductor, under some embodiments.

FIG. 4 is a more detailed diagram of the HV charging system of FIG. 3. FIG. 4 illustrates a high-voltage, high-energy capacitive conversion system incorporating a bifilar or multifilar-wound ferrite toroid inductor, under some embodiments. As shown in FIG. 4, the capacitive conversion system 400 comprises the two banks A and B (402, 404) of the HV capacitance bank that is charged by genset 410. The overall supervisory control function (306 in FIG. 3) is split between a HV (high-voltage) control unit 408 and an SV (service voltage) control unit 414. Switching between bank A 402 and bank B 404 is controlled by the bank switching unit 406, which is controlled by the HV control portion 408 of the supervisory control function. Physical switch S4 (412) switches between bank A and bank B in response to a control signal from the supervisory control unit 408. The embodiment of FIG. 4 includes inductor L1 (418), which is controlled by switch S1 (416) and SV control unit 414. The SV control unit 414 also controls the coupling of the SV bank 420 to the load 422.

In an embodiment, system 400 meters energy via switch S1, 316 from the high voltage (HV) storage side to a load voltage. In previous systems, such as battery-based power converters, switching converters or Buck converters are typically used. However, as mentioned above, Buck converters feature a fixed frequency, whereas embodiments of the high-voltage, high-energy capacitive conversion system of FIG. 4 eliminate this fixed frequency component.

With respect to nomenclature, energy converted in system 400 and as measured in Joules (J) is equal to the estimated relative permittivity times voltage squared times the capacitance all divided by two, as shown in Equation 5.0:

$$J = (\varepsilon r * V^2)/2 \quad \text{Equation 5.0}$$

In system 400, the energy is metered by switch S1 as controlled by an open or closed state of the switch. When switch S1 is turned on, the HV bank 402/404 is connected to inductor L1 (418). The difference in the amount of voltage decrease is approximately equal to that amount of Joules so converted when S1 is turned-off. This is shown in Equation 4.1:

$$J_{converted} = (J_{S1=1, \, at \, t=0} - J_{when \, S1=turned \, off}) \quad \text{Equation 5.1}$$

The measured voltages at either the HV bank or the SV bank (the right side of Equation 5.1 $J_{converted}$) is defined per Equation 5.0 as a relative voltage if S1 is open (or off). Put another way, the relative voltage equates to the instant static voltage. In contrast, when S1 is closed (enabled), the measured voltage at either the HV bank or the SV bank is defined per Equation 5.0 as kinetic voltage. In this embodiment, S1 is closed only when the SV bank is under load (i.e., connected to load 422).

With respect to instant static voltage, as high-energy, high-voltage capacitor banks are only available as supercapacitors, such supercapacitors have distinct continuous static leakage currents. Consequently, as a small amount of current leaks continuously, successive voltage measurements (e.g., by a long meter such as a 6.5 digit DVM) will show an equivalent loss of voltage, meaning that the relative voltage equates to an instant static measurement.

For purposes of description, "metering" is defined as switch S1 closed for a calculated specific pulse width at a specific duty cycle. In this case, "calculated" is defined as that of various commonplace digital/analog circuits for monitoring the HV/SV bank voltages and thereby setting an appropriate S1 pulse width. For example, monitoring the SV bank voltage and setting the S1 pulse width by measurement of the present HV bank voltage and computing the voltage through an algorithm that opens S1. Then, at the point the HV bank voltage is depleted through the metering, S1 is thereby turned off. It should be noted that "commonplace" means analog/digital circuits that are incorporated into everyday production and use (e.g., commercial, industrial and military products and instruments). One type of commonplace circuit is to monitor the SV bank voltage, add the voltage that equals approximately a volt; whereby at the point the measured SV bank voltage is increased through the metering, switch S1 is turned-off.

Figure 5:
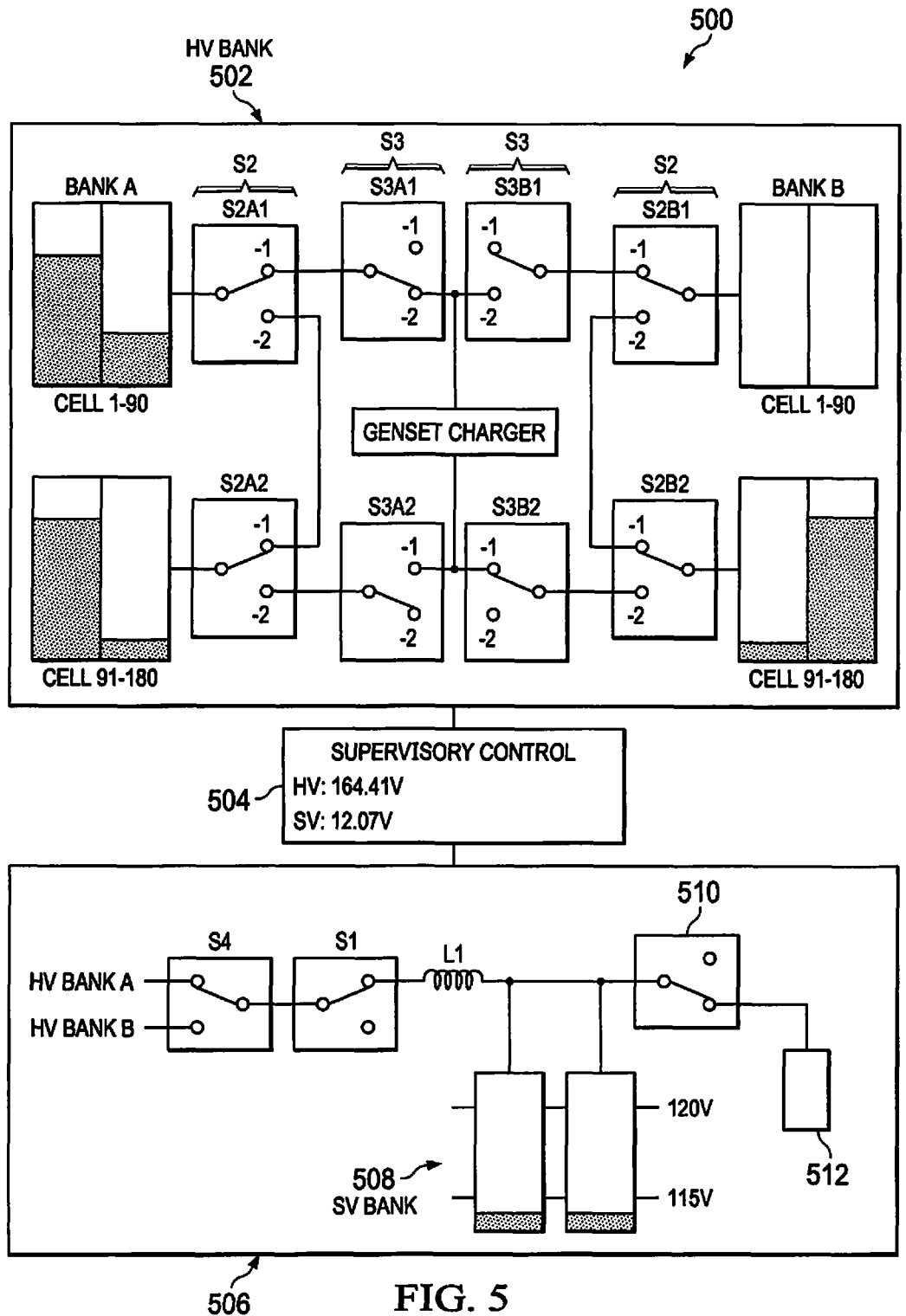
FIG. 5 illustrates a simplified representation of the supervisory control component of FIG. 4, under some embodiments.

FIG. 5 illustrates a simplified representation of the supervisory control component of FIG. 4, under some embodiments. As shown in diagram 500 of FIG. 5, supervisory control unit 504 is disposed between the HV bank 502 having and the SV bank 506. The HV bank 502 has two banks, bank A and bank B, each with a number of stacked supercapacitor cells, and two-section switching to transfer energy among the cells between and within each bank. The SV bank section 506 has an SV bank storage system 508 coupled to load 512 through load switch 510. The transfer of energy to the SV bank 508 is controlled by switches S4 and S1 and inductor L1. In an embodiment, L1 is a bifilar-wound toroid inductor, and will be described in greater detail below. Some of the representative configuration and operation values shown in FIG. 5, such as the number of cells in banks A and B, and the voltage levels of the HV and SV sections are provided for example only, and other values and configurations may be used.

Figure 6A:
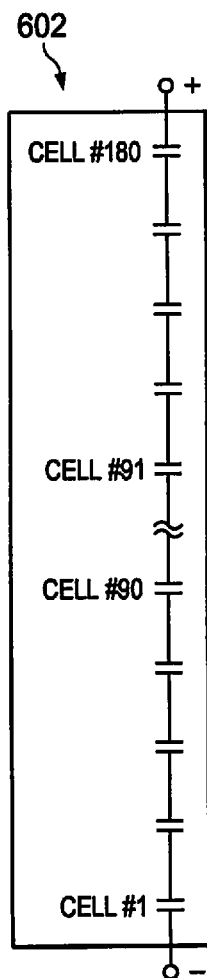
FIG. 6A illustrates an example configuration of the supercapacitor cells in the HV bank of FIG. 5, under some embodiments.

As shown in FIG. 5, the HV bank portion 502 comprises two separate internal banks A and B. Each of these banks comprises a number of stacked supercapacitors. FIG. 6A illustrates an example configuration of the supercapacitor cells in the HV bank of FIG. 5, under some embodiments. FIG. 6A illustrates an example supercapacitor stack of 180 cells. The stack is divided into two halves, from cell 1 to cell 89 and from cell 90 to cell 180. These two halves are denoted as Section A and Section B. This expedites the charging function, as a switching arrangement can be used so that the genset (or other EMF source) charges the entire stack at a lower voltage by charging each section separately. It should be noted that the number and composition of capacitors in the stack can vary depending on system constraints and requirements. The stack could contain any practical number of cells, and the number of sections dividing the cells can also vary depending on the genset power and charging requirements. For example, the cells could be divided into four sections or eight sections, and so on.

The supercapacitors used in the HV bank 502 may be any appropriate type of supercapacitor, such as double-layer capacitors (EDLCs) with activated carbon electrodes or derivatives, pseudocapacitors with transition metal oxide or conducting polymer electrodes with a high electrochemical pseudocapacitance, or hybrid capacitors with asymmetric electrodes. Although FIG. 5 illustrates a stack of supercapacitor cells, it should be noted that any equivalent structure that achieves the necessary and/or desired storage capacity may be used.

Figure 6B:
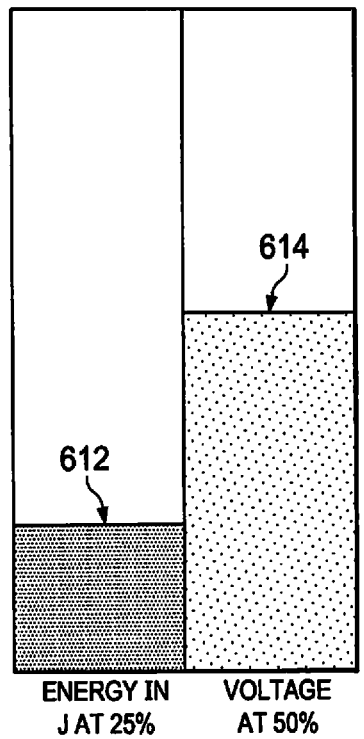
FIG. 6B is an example bar chart of energy versus voltage for the example capacitor bank of FIG. 6A.

FIG. 6B is an example bar chart of energy versus voltage for the example capacitor bank of FIG. 6A. As shown in FIG. 6B, the energy in Joules at 25% is at level 612 while the voltage at 50% is at level 614. This illustrates that there is a divergent voltage swing versus energy. That is, the capacitor bank (or any capacitor) voltage will decrease 50% over its 75% energy range.

Figure 7:
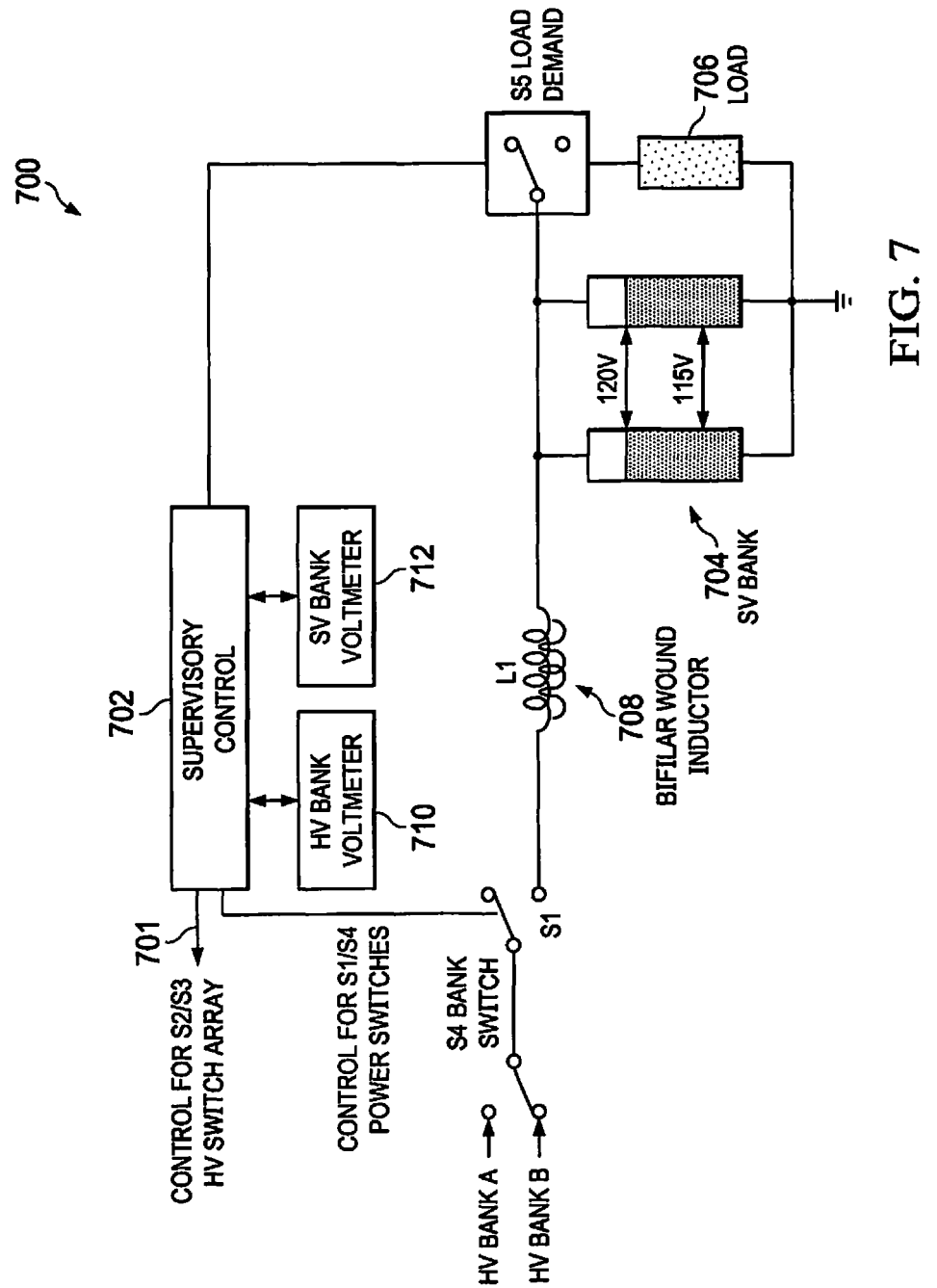
FIG. 7 is a block diagram of the supervisory control, switching and inductor connections to the SV bank, under some embodiments.

FIG. 7 is a block diagram of the supervisory control, switching and inductor connections to the SV bank, under some embodiments. As shown in diagram 700, the S4 bank switch selects between bank A and bank B of the HV bank section. This switch setting along with a control signal from the supervisor/y control unit 702 controls the state of switch S1, which engages or decouples the inductor L1 708. In an embodiment and as represented in FIG. 7, inductor L1 is a bifilar wound inductor (with two coils), and each end of L1's second winding can be shorted or coupled to a diode/resistor network (snubber). Energy from the HV bank section is fed through inductor L1 (when switch S1 is closed) to the SV bank 704 and on to load 706 through load demand switch S5. As shown in FIG. 7, the SV bank has a voltage that is maintained between 115V and 120V, for example. The SV bank is shown at 120V and the trigger point to charge is set at 115V. Diagram 700 illustrates an amount of separation that is intended to emphasize the ability to control the voltage at 117.5V+/−2.5V.

Figure 8:
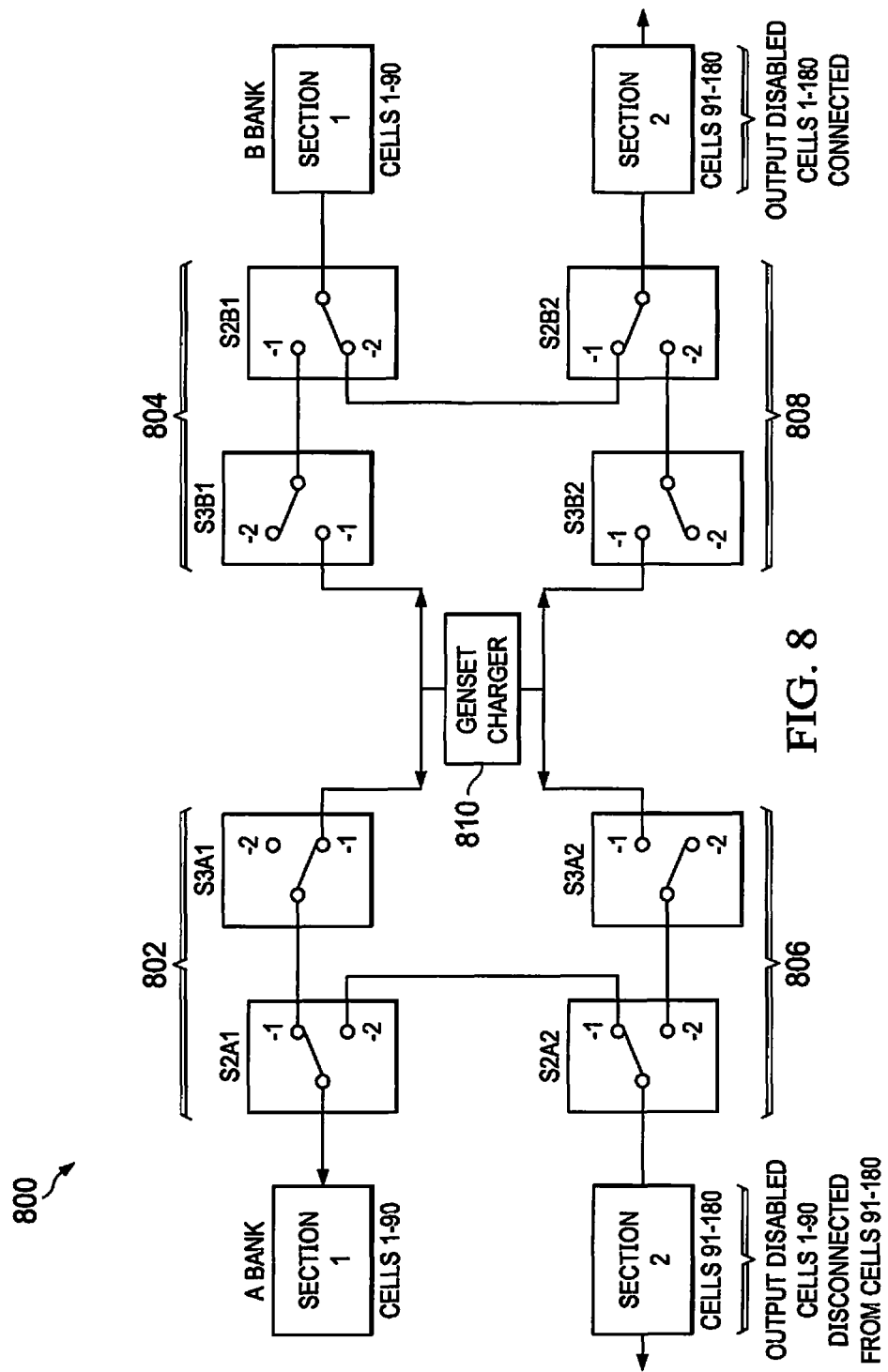
FIG. 8 illustrates an example switching topography for the HV bank section, under some embodiments.

FIG. 7 also shows a control signal 701 from supervisory control unit 702 to provide control signals to the S2/S3 switch array in the HV bank. As shown in FIG. 5, the HV bank 502 contains two discrete switches S2 and S3 divided into a set of eight switch functions. FIG. 8 illustrates an example S2/S3 switching topography for the HV bank section, under some embodiments. FIG. 8 represents a more detailed diagram of the switching and genset circuitry 502 of FIG. 5. System 800 shows the composition of the two HV banks A and B with each having two sections of stacked supercapacitor cells denoted Section 1 with cells 1-90 and Section 2 with cells 91-180. This creates four separate regions 802 to 808 for charging by the genset charger 810. Region 802 is Section 1 of the A bank (denoted A1) and contains switches S2A1 and S3A1; region 804 is Section 1 of the B bank (denoted B1) and contains switches S3B1 and S2B1; region 806 is Section 2 of the A bank (denoted A2) and contains switches S2A2 and S3A2; and region 808 is Section 2 of the B bank and contains switches S3A2 and S3B2. The switches S2 and S3 split each of the two banks A and B into two sections for charging one section at a time. FIG. 8 illustrates some example diagrammatic connections of these switches for the case where the genset 810 charges Bank A, Section 1 (A2). The charging function operates wholly independently while its counterpart bank is connected to switch S1 through switch S4 (as shown in FIG. 7). Once the second section of a bank is fully charged, it is reconnected as one bank (cells 1 to 180). At the point the counterpart back voltage decreases to about 50% of full voltage, its counterpart bank takes the feed and the depleted bank is then charged in the same manner.

FIG. 9A shows the genset switch contact assignments used in FIG. 8, under an embodiment. FIG. 9A shows the configuration of certain contacts denoted S2A1, S2A2, S2B1, S2B2, S3A1, S3A2, S3B1, and S3B2, and the respective assignments to sections 1 and 2, under an example embodiment.

FIG. 9B shows a table of the charging schedule for FIG. 8, under an embodiment. In this example, the full bank voltage is 510V when Sections 1 and 2 are connected together in series as shown in the diagram Bank B. Genset delivers 200A to each Section (1 or 2) separately charging each to 255V as shown in the diagram Bank A. The full bank voltage is 510V. When depleted to 50% the full bank voltage is approximately 255V. Each section will be at approximately 123 V (50% of 255V). Each section will be charged at 200A from approximately 123V to 255V. When the two sections are reconnected into a single bank, the voltage will then be restored back to approximately 510V.

Figure 10:
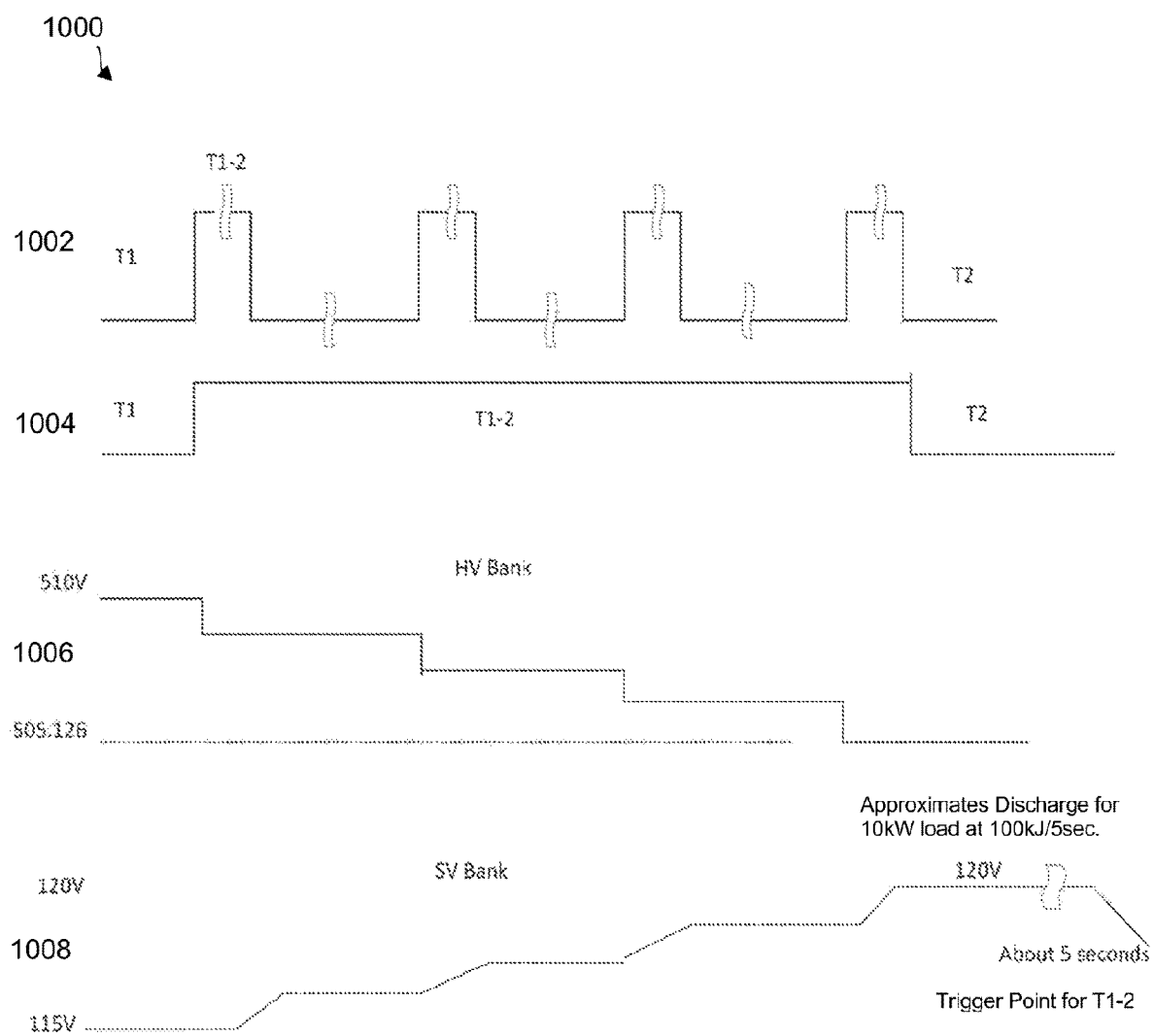
FIG. 10 is a timing diagram for charging the HV capacitor bank through the S1 switch, under some embodiments.

As stated above with respect to FIG. 3, the supervisory control circuit 306 includes a pulse generator to synchronize the control of the switching circuitry between the HV capacitor bank and the SV capacitor bank. FIG. 10 is a timing diagram for charging the HV capacitor bank through the S1 switch, under some embodiments.

Waveform 1002 illustrates how switch S1 pulses through inductor L1 a current at a certain level T1, such as 7A. As noted with respect to FIG. 7, the SV bank 704 is maintained between 115V and 120V, such that the SV bank voltage discharges across load 706. At that point, the switch S1 is enabled for a short amount of time (e.g., several milliseconds) or for just enough time to raise the SV bank voltage from 115V to 116V. After a short time duration (e.g., 100 milliseconds), a second L1 pulse is enabled so that the SV bank voltage is raised another volt, i.e., from 116V to 117V. Successive L1 pulses raise the SV bank voltage back to 120V. This is shown as waveform 1008, which illustrates the SV bank voltage ramping up from 115 to 120V. The full time period to raise the SV bank voltage to the fully charged level of 120V is shown as waveform 1004. Waveform 1006 represents an approximation of the HV bank voltage decrementing with each L1 pulse 1002. Although specific voltage levels are described, embodiments are not so limited and actual voltage ranges and values may vary depending on system configuration and requirements.

Figure 11A:
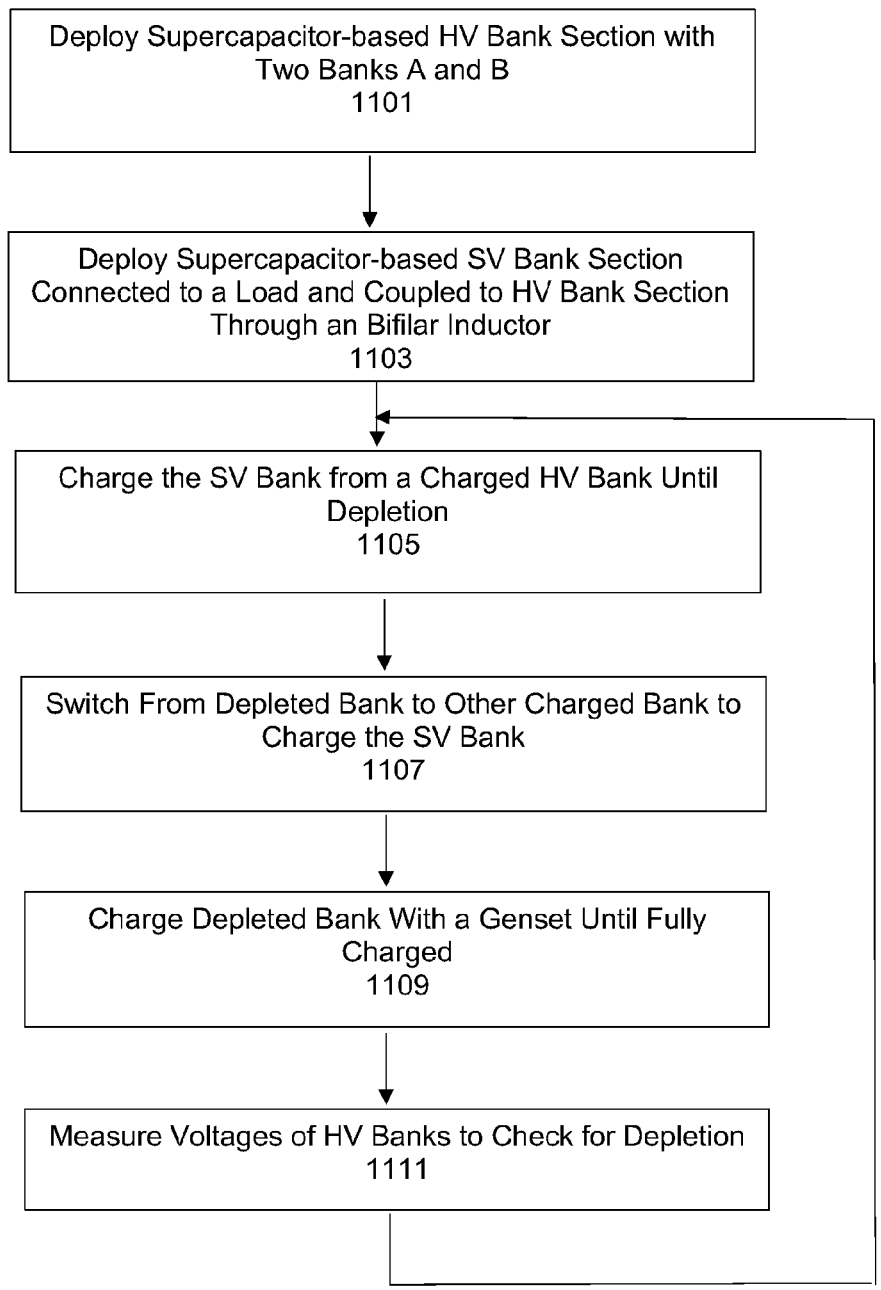
FIG. 11A is a flowchart illustrating an overall method of transforming power from an HV capacitive bank to an SV bank through a bifilar inductor, under some embodiments.

FIG. 11A is a flowchart illustrating an overall method of transforming power from an HV capacitive bank to an SV bank through a bifilar inductor, under some embodiments. The flowchart of FIG. 11A relates to the system architecture shown in FIG. 5 with HV and SV capacitor banks coupled through an inductor, with the HV bank divided into banks A and B. The process of FIG. 11A starts by providing or deploying an HV bank section using supercapacitors arranged into two banks A and B, step 1101. Each bank can comprise a number of stacked supercapacitor cells, such as shown in FIG. 6A. The HV bank is coupled to a supercapacitor SV bank section and load through a bifilar (or multifilar) inductor, step 1103. Through an intelligently controlled transmission and switching network, the SV bank is charged from one of the banks (A or B) of the HV bank section, depending on which one is fully or more charged than the other. The SV bank is charged from this HV bank until the HV bank is depleted, step 1105. Depletion may be defined as a voltage level at or below a defined minimum threshold voltage level for a charging bank. Upon depletion, the supervisory controller switches from the depleted bank to the other bank, which should be sufficiently or fully charged, to charge the SV bank, step 1107. The depleted bank is charged by the genset (or other power supply) as the other HV bank charges the SV bank, step 1109. The voltage levels of the HV banks is continuously or periodically checked for depletion, step 1111, and the alternate charging and switching steps are performed continuously for a desired deployment period.

Figure 11B:
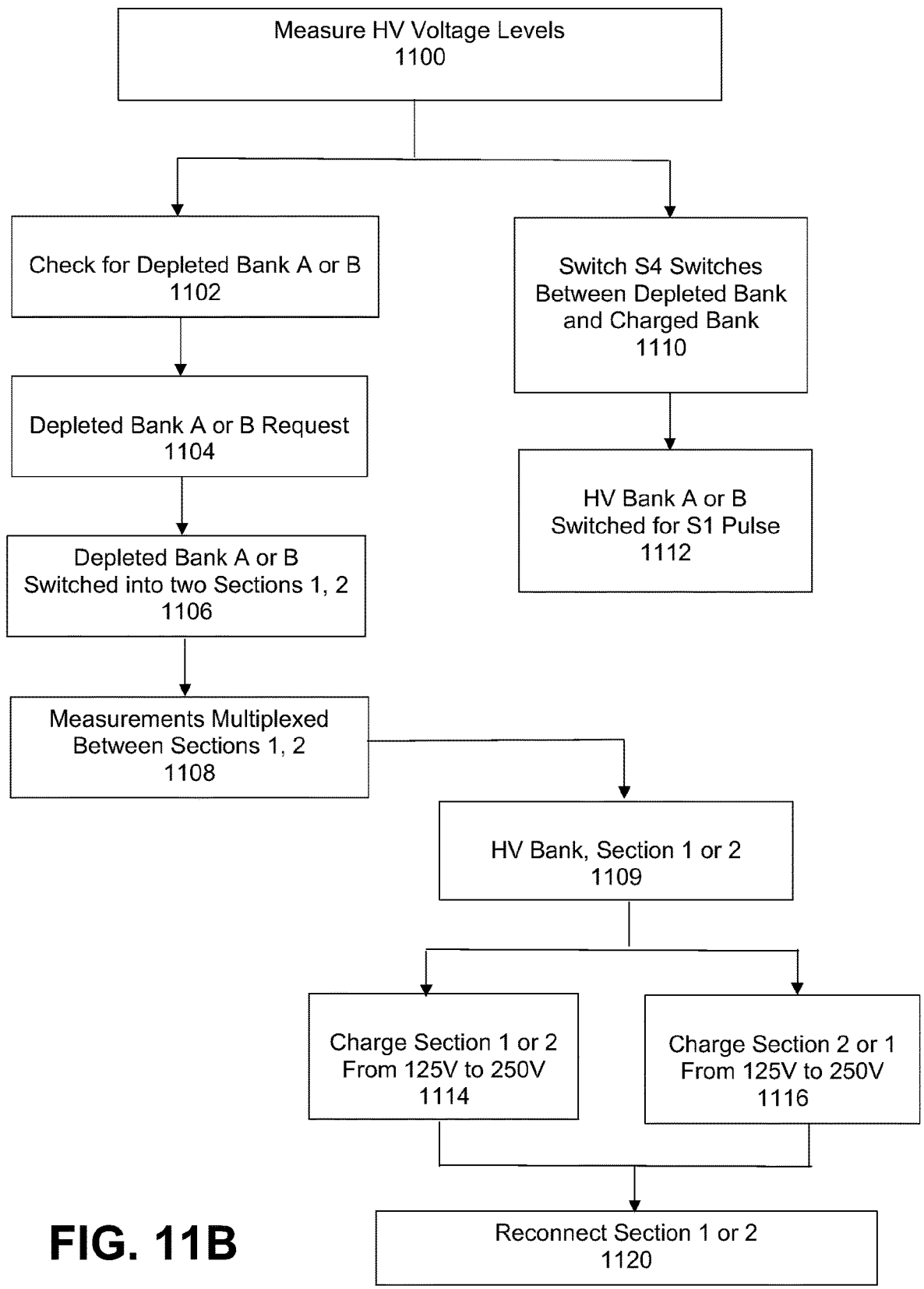
FIG. 11B is a flowchart illustrating a method of charging two HV capacitive banks having two sections each through a switch array, under some embodiments.

As described above, the HV banks may be divided into separate sections to optimize the charging process. FIG. 11B is a flowchart illustrating a method of charging two HV capacitive banks having two sections each through a switch array, under some embodiments. The flowchart of FIG. 11B relates to the system architecture shown in FIG. 5 with two HV banks A and B, each having two sections 1 and 2, and controlled by switches S1, S2, S3, and S4. FIG. 11B represents a slightly more detailed representation of the process illustrated in FIG. 11A. The process of FIG. 11B starts by measuring the voltage levels of the two banks A and B. This measurement step checks for a depleted bank either A or B in the HV bank section, step 1102. The depleted bank (A or B) then issues a request, step 1104. In response to the request, the switch S4 switches between the depleted bank (A or B) and the charged bank (B or A), step 1110. The depleted bank is then switched for the S1 pulse from the pulse generator, step 1112. The depleted bank is then switched into two sections 1 and 2, step 1106. These measurements are multiplexed between the two sections 1 and 2, step 1108. For these two sections 1109, the process charges either section 1 (step 114) or section 2 (step 116) from approximately 125V to approximately 250V. After both sections are charged, these two sections are reconnected to each other, step 1120.

Toroidal Bifilar Inductor

As shown in FIG. 7, the inductor L1 is a bifilar wound toroid inductor. As stated previously, such an inductor provides the attributes of: (1) limiting back EMF, (2) expansion over time of the B/H curve inductance, and (3) adiabatic loading. With respect to the charge time of the SV bank as illustrated in FIG. 10, the inductor L1 also provides another advantage, that of minimizing the effective time to increase the SV bank voltage by one volt increments. With reference to FIGS. 5 and 6A, the HV bank section is divided into two banks, A and B. In an embodiment, each bank contains 180 EA stacked 4000 F×2.85V supercapacitor cells. Fully charged, at 510V at 22.2222 F, each bank holds 3 MJ of energy. At depletion, or 50% of the voltage (250V), roughly 75% (or 2.1 MJ) of the energy is transformed out of the HV bank. At this point, at approximately 250V, the current HV bank begins to charge and the load is switched to the other bank. The SV bank capacitance is equal to the HV bank, but its supercapacitors are coupled together in parallel rather than in series as they are in the HV bank. Accordingly, to raise the SV bank by approximately one volt requires about 8 MJ to 10 MJ. This means raising the SV bank voltage from 115V to 120V would be a conversion of about 40 MJ. In conventional pulse conversion of current I across inductor L1 would be on the order of hundreds of milliseconds. However, as shown in FIG. 2, the peak current comes out far less than a singularity peak current. For this reason, switch S1 is only on for a few milliseconds. This means that the overall charge duty cycle is reduced accordingly.

Figure 12:
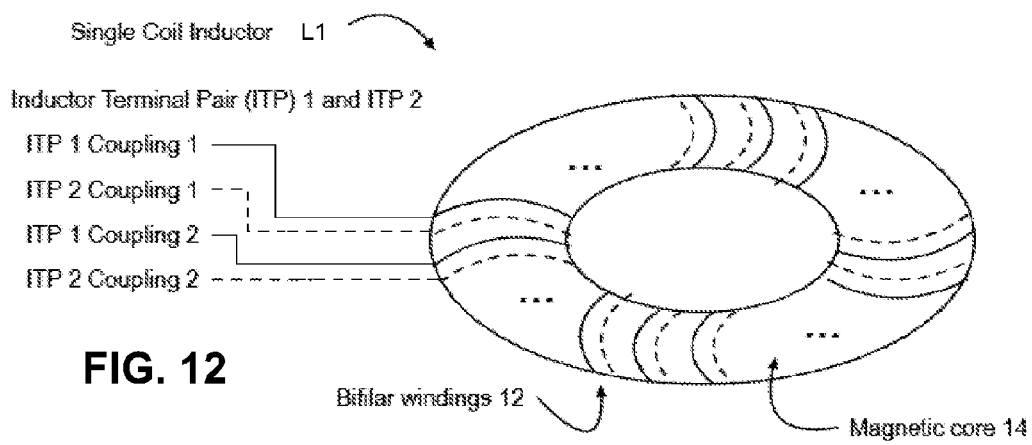
FIG. 12 illustrates a toroidal, bifilar inductor used in a capacitive conversion system, under some embodiments.

FIG. 12 illustrates a single coil inductor denoted as L1 including a magnetic core 14, bifilar windings 12 about the magnetic core, two terminal pairs referred to as inductor terminal Pair (ITP) 1 and ITP 2, each terminal pair coupled to a separate magnetic wire in the bifilar windings. Note that in some embodiments, the single coil inductor includes a winding component about the magnetic core, wherein the winding component consists essentially of the bifilar windings coupled to ITP 1 and ITP 2.

The single coil inductor L1 uses the bifilar windings 12 about the magnetic core 14 to enhance energy transformation, improve the effectiveness of adiabatic loading, and diminish back EMF. As used herein, the term bifilar winding refers to at least two parallel magnetic wires. The magnetic core 14 refers to a toroidal core. The magnetic core 14 may be composed of one or more magnetic materials, either arranged as separate material components, or mixed as one or more composite material components. In situations in which there are separate material components, the core is made from these separate material components. In certain implementations a single material such as ferrite may be used to manufacture the magnetic core.

The single coil inductor includes two pairs of terminals: A first terminal pair (ITP 1) electrically coupled to a first magnetic wire of the bifilar windings 12. A second terminal pair (ITP 2) is electrically coupled to a second magnetic wire of the bifilar windings. The second terminal pair is adapted to minimize back EMF. For instance, the two terminals of the second terminal pair may be electrically coupled to minimize back EMF.

As used herein, bifilar windings 12 refer to parallel magnetic wires, which refers to an article of manufacture containing at least two magnetic wires which are all locally parallel to each other which may form a ribbon with each of the wires electrically isolated from the other by insulative material. In some embodiments, the magnetic wires may or may not be individually coated with electrical insulation. The magnetic wires may or may not be embedded in parallel between two sheets of insulative material, which are brought together to bond the wires and the insulative material together to make the create the parallel bonded magnetic wire ribbon. The insulated magnetic wires may then be arranged in parallel to each other, and may be bonded together to form a parallel bonded magnetic wire ribbon. The magnetic wires may be primarily composed of a metal, for instance copper or aluminum, an alloy of two or more metals, of a layered wire, possibly containing an inner layer of aluminum and an outer layer of copper. Another alternative layer wire may contain an inner layer of copper and an outer layer of aluminum.

Figure 13:
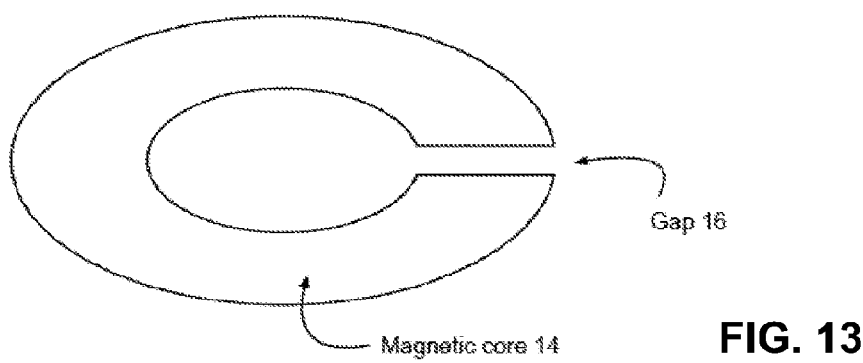
FIG. 13 shows some details of the magnetic core with a gap for the inductor of FIG. 12, under an embodiment.

As stated previously, one way to alleviate the low $B_{sat}$ point of ferrite for high currents may be to insert a gap into the magnetic structure. The toroidal magnetic structure (in any of the multifilar configurations) lends itself to a gap configuration. Thus, in one embodiment, the toroidal magnetic core 14 of FIG. 12 is configured with a gap, as shown in FIG. 13, which shows some details of the magnetic core 14 as a toroidal core with a gap 16. The gap 16 may be of sized to optimize the advantageous effect of alleviating the low $B_{sat}$ point of the ferrite core.

Figure 14:
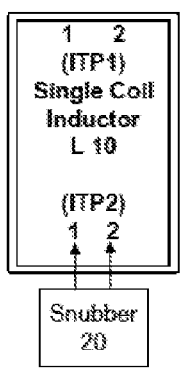
FIG. 14 illustrates a snubber circuit for use with the inductor of FIG. 12, under an embodiment.

As also stated previously, each end of the bifilar inductor's second winding can be shorted or coupled to a diode/resistor network (snubber). FIG. 14 shows the apparatus of FIG. 12 further including a snubber circuit with its two terminals coupled to the terminals of the second inductor terminal pair (ITP 2). The snubber circuit may be implemented as one or more of the following: a resistor and capacitor (RC) snubber 20 including the two terminals of a series circuit of a resistor and a capacitor, collectively adapted to reduce back EMF across the single coil inductor. A diode snubber including a single rectifier diode containing two contacts used to couple to the first terminal pair, also adapted to reduce back EMF across the single coil inductor. An RCD snubber including a parallel coupling of a resistor and a capacitor, which is coupled in series with a diode. The RCD snubber has two terminals. The first terminal of the RCD snubber is to the parallel coupling of the resistor and the capacitor, which is not coupled to the diode. The second terminal of the RCD snubber is to the second terminal of the diode, which is not coupled to the parallel coupling.

Figure 15:
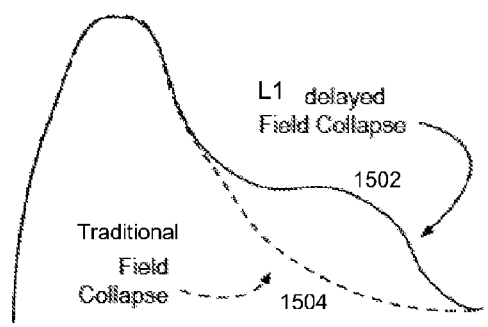
FIG. 15 shows an example advantageous effect of the inductor of FIG. 12 at suppressing back Electro-Magnetic Force (EMF).

FIG. 15 shows the advantageous effect of a single coil inductor at suppressing back Electro-Magnetic Force (EMF), so that the time of the magnetic field collapse is delayed. In some embodiments, energy transfers operate during the time before the collapse of the magnetic field. FIG. 15 thus shows the delayed field collapse 1502 as compared to a traditional field collapse 1504. In some further embodiments, the energy transfers are implemented as successive impulses of small voltage differentials over time intervals, always with the current moving in a single direction. There may be one or more source of the electrical energy transferred across the single coil inductor L1.

Metrology Function

During the course of operation continuous measurements are taken of voltage levels, currents, response times, and so on to ensure that the charging and switching functions illustrated in FIGS. 11A and 11B are performed optimally. To ensure accurate measurement and comparison of these values certain metering/measuring (metrology) functions and components are included. In an embodiment, a metrology function of the capacitive energy transform device comprises: (1) an isolated low-noise power supply (PP-1), which may be a 48V (or similar) super-capacitor switching setup; (2) a highly regulated supply voltage, $V_{cc}$ and reference voltage, $V_{ref}$ Driven by PP-1 (these supplies may be temperature-controlled at around 35° C., resulting in low-ppm stability and accuracy); (3) a probe; and (4) the logic design for the circuitry described above.

The supervisory control function and component 504 of FIG. 5, comprises certain elements. These include multiplexing switches, a number (e.g., three) electrometer probes, several DAC (digital-to-analog converter) circuits, a clock generator, and specially designed power supplies. These allow the operation of the two HV banks of capacitors and the one SV bank, and the operational coordination of having the two HV banks alternate such that one bank is always ready to deliver power; while the other bank is charged by the genset in two sections in a continuous fashion.

In actual operation, whereas the SV bank is charged via a single-pulsed S1 in increments of one-volt, the nominal voltage window is (in this embodiment) 115V to 120V. However, in the real world, that window may be down to 114V or up to 121V, or any other possible deviation. The same is true for the HV bank measurements. Where the 50% depletion point may be below 55% in the course of switching banks to ensure continuous power supply. In an embodiment, the measurement system includes electrometer probes that feed a DAC circuit for comparison against a fixed value. For example, one DAC circuit monitors the SV bank feeding its load. When the voltage falls to 115 V, S1 is enabled. The pulse width is set by the DAC circuit turning off S1 at a voltage increase of approximately one volt to 116V. An arbitrary settling time (e.g., 50 milliseconds) is provided to allow S1 to be enabled again for approximately one volt to 117 V; and so forth up to 121 V. Similar other DAC circuits can be used to monitor the depletion voltage and charge voltages.

With respect to DC Metrology, a practical requirement is to make voltage comparisons that have an accuracy and stability on the order of under 20 ppm. This is because the HV bank must be scaled down to (10:1)/2 where the SV bank is scaled down by 10:1. Hence the need for DC metrology grade circuits. The $V_{ref}$ for each DAC must be better than under 20 ppm by four times, or approximately 5 ppm or less. In an embodiment, this is accomplished through a custom 10V $V_{ref}$ device double stacked to 20V. These circuits are made EMI (electro-magnetic interference) and temperature protected by a custom housing.

For the electrometer probe, a sampling capacitor is used. This can be a 0.25% poly, Teflon or sapphire parallel plate configuration. The sampling is accomplished through a make-before-break switching system on each side of the sampling capacitor C11. This thus isolates the probe from all the spurious voltages possible by both banks. The electrometer ensures an accurate voltage sampling with virtually no voltage burden on C11.

FIG. 16 illustrates a supervisory control circuit 1602 with electrometer probes, under some embodiments. FIG. 16 illustrates two sampling capacitor electrometer probes 1603 and 1604 coupled to certain HV bank sections through respective multiplexer switches (Mx Switch). A third probe 1605 is coupled to the SV bank. Diagram 1606 illustrates certain DAC reference circuits for use with the electrometer probes.

Figure 17:
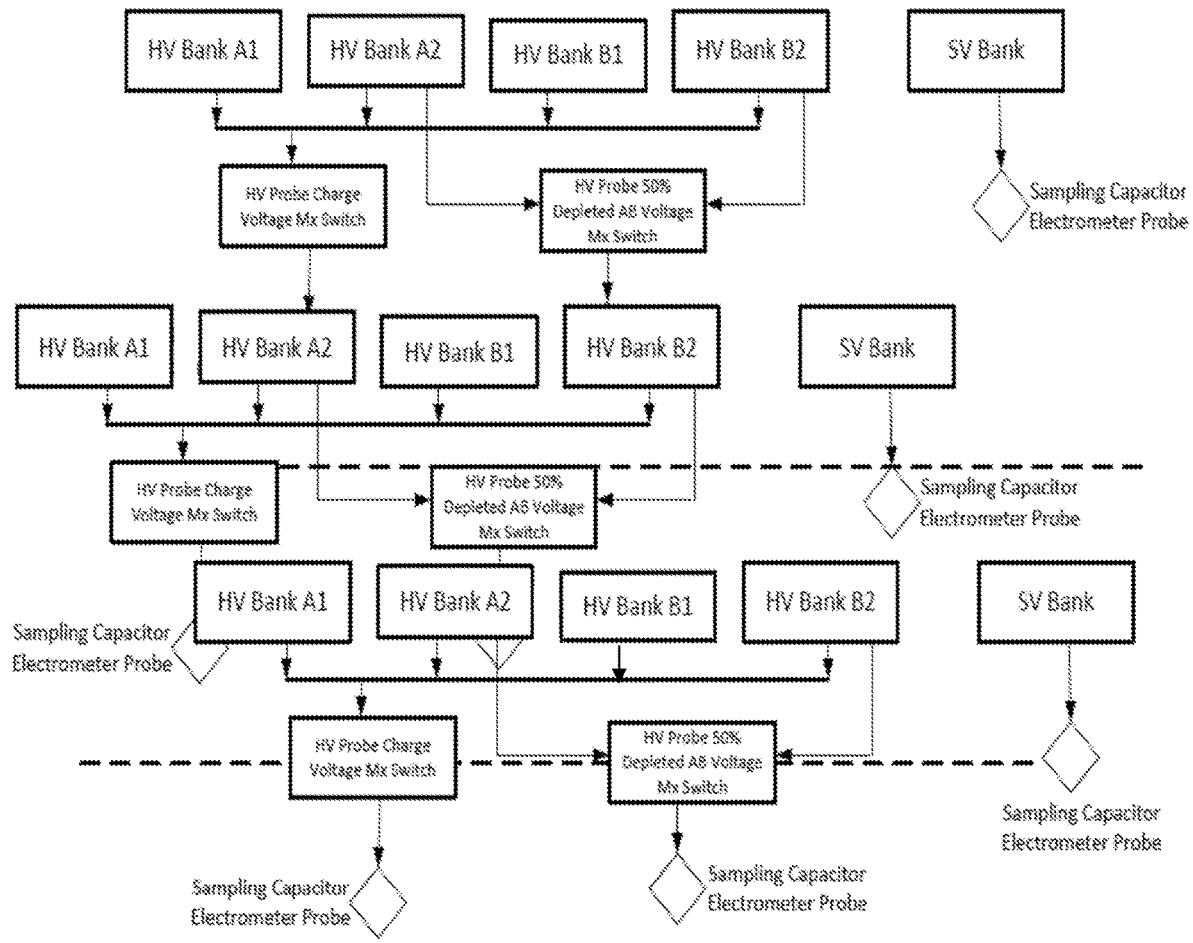
FIG. 17 is a more detailed illustration of the sampling capacitor electrometer probes for the embodiment of FIG. 16.

FIG. 17 is a more detailed illustration of the sampling capacitor electrometer probes for the embodiment of FIG. 16.

FIG. 18 contains Tables 1 and 2 that show certain assignments for the probes of FIGS. 16 and 17, under an embodiment. Although certain specific connections are shown, embodiments are not so limited and other assignments are also possible.

Figure 19:
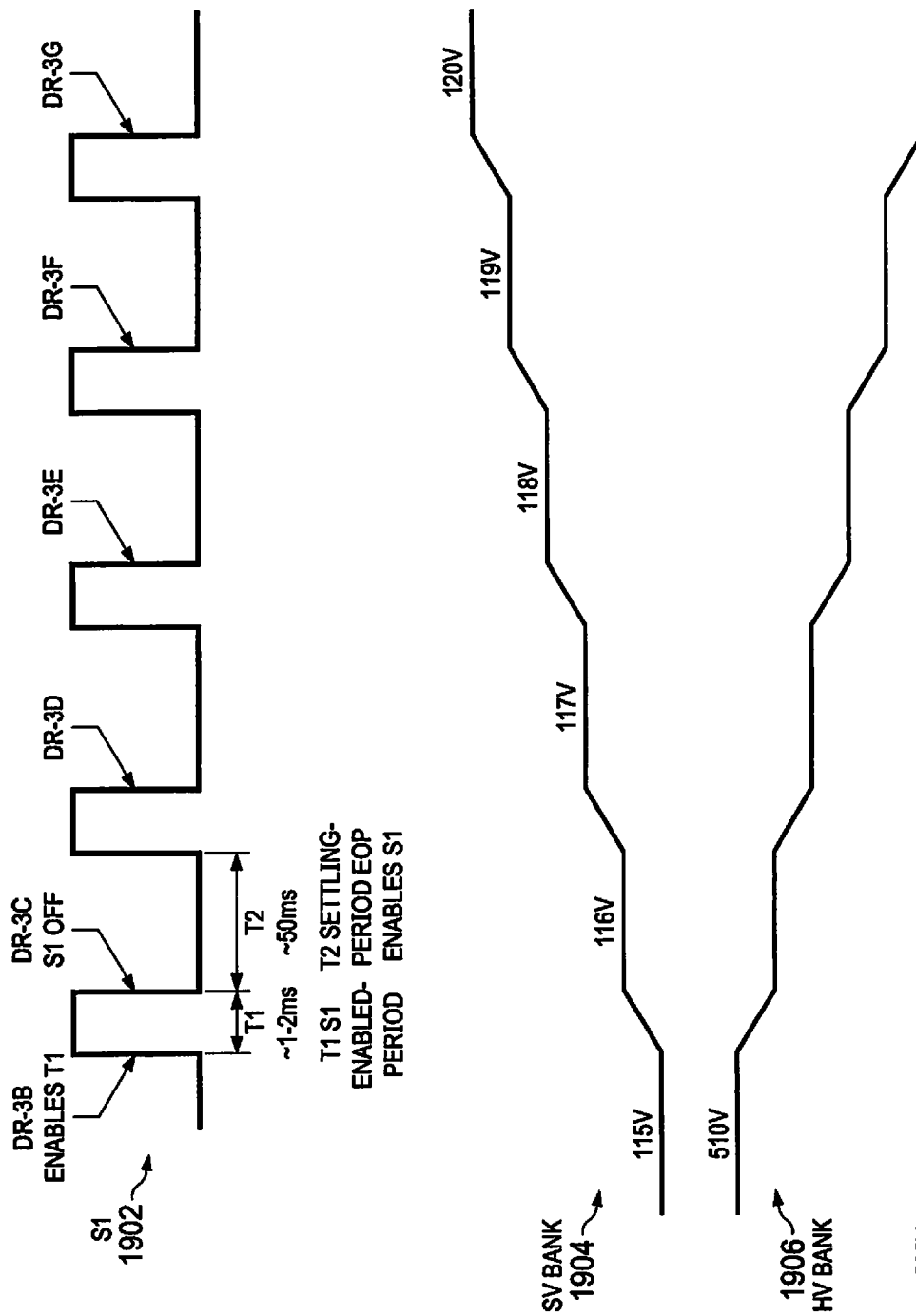
FIG. 19 is a timing diagram showing the increase of the SV bank in one-volt increments and corresponding decrease in the HV bank for switching of the S1 switch, under an embodiment.

FIG. 19 is a timing diagram showing the increase of the SV bank 1904 in one-volt increments and corresponding decrease in the HV bank 1906 for switching of the S1 switch, under an embodiment. As shown in FIG. 19, the clock generator 1902 alternately enables and turns off S1 through signal pulses of the probe DR-3. This diagram is related to the reference circuits assigned in Table 2 of FIG. 18.

Applications

Embodiments of the power converter described herein may be used in a variety of different applications, such as the hybrid vehicle application. Another application may be as used in an elevator backup system. Such a system could be wholly passive, as an always-on primary-powered charger. Thus, it may sit for years without use; and unlike alternative to battery systems that require regular inspection and maintenance, no such continuous attention is required for a capacitive-based MJ power converters. When enabled, if an elevator fails or primary or backup power fails, such a system will ensure trapped riders caused by elevator stalling can exit safely and/or support first responders.

Another example embodiment of the power converter may be incorporated into electric vehicle EV charge systems. In this configuration, there are several potential applications. One is for quick charging on the road, like a roadside assistance rescue. Another is at the charger site, where a power converter could increase the charger power. For example, in a 50 kW SAE International DC Combo (CCS) charger-station. By supplementing the CCS 50 kW with the power converter; a 12 MJ system would cut down charge time by about half. This embodiment illustrates another beneficial attribute, in that the power converter can be charged as slow or fast as is available through the charging system. For example, for only a 115 VAC MPS charge power source, it could take perhaps two minutes to recharge the MPS power converter instead of the one (1) minute charge described herein. In this case of a slower charge source, the power converter would turn out a lower duty cycle.

In general, Electric Vehicle charge stations comply with one of three standards. 1) SAE Int'l J1772 Level 1 and Level 2; 2) SAE International Fast Charge Combo (CCS), Tesla Supercharger; and, 3) the CHAdeMO (Japan). These standards are supported by various international charge station makers to ensure that the charger charges a car maker's battery system safely and effectively. Equally fitting however, is that commonality between Li-ion size charging and the time of charge. As all EV's use Li-ion battery chemistry, regardless of the type of charger or its standard the same energy rating applies. For an example of the same energy rating, the current EV range of a charged battery pack runs just over 200 miles. So that whether a GM BOLT EV (CCS), a Tesla Model 3 (Tesla), or a Nissan Leaf, (CHAdeMO), the battery pack is right around 60 kW. So that, whichever the applicable standard, for these with a 60 kW battery pack, the charge will always approximate the 60 kW battery pack. This commonality defines, in part, the power converter charging application. Using a Bolt EV CCS charger rating of 200 miles for 72 minutes at 60 kW, an MPS power converter could add another 60 kW, cutting the 72 minute period down by half for the period of MPS charge. As an example, a continuously charged MJ MPS power converter could add the 60 kW for 36 minutes; the original time of charge (72 min) for adding 200 miles of range cut in half.

With respect to the quick charge (e.g., for roadside assistance), a one-time charge of three (3) minutes would add about 10 miles of range. This may well be enough to get off the highway and to a charging station. There are alternative possibilities, such as, as a charging station back-up, or alleviating a queue at the charging station. It will be appreciated that these are only some example applications and many other or similar applications may also be used.

Embodiments are directed to a method comprising providing an HV bank section using supercapacitors arranged into two banks A and B; coupling the HV bank to a supercapacitor SV bank section and load through a multifilar inductor and switching circuit controlled by a supervisory controller; charging the SV bank from a more fully charged bank of bank A or B until the charging bank is depleted; switching, upon depletion of the charging bank, from the depleted bank to the other bank of bank A or B to charge the SV bank; charging the depleted bank by a power supply as the other HV bank charges the SV bank; and repeating the switching and charging process between the two banks for a defined deployment period. The multifilar inductor may be a toroidal inductor having two or more independent coils wrapped around a toroidal ferrite core, and the ferrite core may have a gap. The supercapacitors may have a capacitance on the order of 1 to 10 MegaJoules.

In an embodiment, each bank A and B contains 180 EA stacked 4000 F×2.85V supercapacitor cells. The power supply may comprise a genset including a generator and internal combustion engine powered by one of: diesel, petrol, propane or natural gas. The depletion of the charging bank may be defined as a voltage level at or below a defined minimum threshold voltage level for the charging bank. In an embodiment, each bank A and B is divided into two sections for optimal charging by the power supply. The switching circuit may be four switches denoted S1, S2, S3, and S4, and wherein S1 couples the inductor to the HV bank, S2 and S3 switch between the two sections for each respective bank A and B, and S4 switches between bank A or B of the HV bank for an alternating bank switching process. There may be a pulse generator synchronizing and triggering charging of the SV bank based on defined threshold voltages for the depletion and charge levels of the HV banks A and B, and SV bank, and the charging of the SV bank may be triggered in response to one-voltage steps over a range of 115V to 120V of the SV bank.

Embodiments are further directed to an inductive device for transforming high-current input energy to a useful voltage level, comprising: two or more windings wrapped around a toroidal ferrite core; a set of input terminals coupled through a switch, S1, to an HV bank section using supercapacitors arranged into two banks A and B; and a set of output terminals coupled to an SV bank section and load, wherein the SV bank section is charged by one of the two banks A and B depending on a relative charge level of bank A or B. The ferrite core may have a gap, and the inductive device may further comprise a set of terminals coupled to a snubber. In an embodiment, the constituent components are configured to reduce back electromotive force (EMF), provides high-current integration, reduce adiabatic loading problems, and minimizing an effective time to increase the SV bank voltage, all to enable more efficient transformation of energy from the HV bank to the SV bank.

Embodiments are yet further directed to a capacitive energy transfer device comprising an HV bank section using supercapacitors arranged into two banks A and B; a transmission section coupling the HV bank to a supercapacitor SV bank section and load through a multifilar inductor and switching circuit controlled by a supervisory controller; a charging and control path charging the SV bank from a more fully charged bank of bank A or B until the charging bank is depleted and switching, upon depletion of the charging bank, from the depleted bank to the other bank of bank A or B to charge the SV bank, and further charging the depleted bank by a power supply as the other HV bank charges the SV bank; and a control circuit repeating the switching and charging process between the two banks for a defined deployment period. The multifilar inductor may be a toroidal inductor having two or more independent coils wrapped around a gapped toroidal ferrite core, and wherein the power supply comprises a genset including a generator and internal combustion engine powered by one of: diesel, petrol, propane or natural gas. The supercapacitors may have a capacitance on the order of 1 to 10 MegaJoules, and wherein each bank A and B contains 180 EA stacked 4000 F×2.85V supercapacitor cells. In an embodiment, the depletion of the charging bank is defined as a voltage level at or below a defined minimum threshold voltage level for the charging bank, and wherein each bank A and B is divided into two sections for optimal charging by the power supply. The switching circuit may be four switches denoted S1, S2, S3, and S4, and wherein S1 couples the inductor to the HV bank, S2 and S3 switch between the two sections for each respective bank A and B, and S4 switches between bank A or B of the HV bank for an alternating bank switching process, and further comprising a pulse generator synchronizing and triggering charging of the SV bank based on defined threshold voltages for the depletion and charge levels of the HV banks A and B, and SV bank, and wherein the charging of the SV bank is triggered in response to one-voltage steps over a range of 115V to 120V of the SV bank.

Embodiments are generally described for inductors or inductive circuits with multifilar windings to minimize or defeat destructive back EMF. Such as an inductor can be used in a genset apparatus comprising a charging circuit to a high voltage (HV) capacitor bank. A switching circuit (S1) to switch such HV into a magnetic structure; and, an output circuit to charge a service voltage capacitor bank (SV). The SV bank may be active only under load, and a control circuit monitors the SV bank such that S1 operates between certain voltage limits. The inductor may comprise a multifilar wound toroidal inductor that improves effective energy processing and adiabatic loading effectiveness. Embodiments include intelligently switching supercapacitor-stored energy into a multifilar toroidal inductor to transform high levels of energy to useful voltages Although certain embodiments have been described and illustrated with respect to certain example configurations and components, it should be understood that embodiments are not so limited, and any practical configuration, composition, operating ranges or selection of components is possible. Likewise, certain specific value and operating parameters are provided herein. Such examples are intended to be for illustration only, and embodiments are not so limited. Any appropriate alternative may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method comprising:
providing a high voltage (HV) bank section using capacitors arranged into two banks A and B;
coupling the HV bank to a capacitor-based service voltage (SV) bank section and a load through a multifilar inductor and switching circuit controlled by a supervisory controller;
charging the SV bank from a more fully charged bank of bank A or B until the charging bank is depleted;
switching, upon depletion of the charging bank, from the depleted bank to the other bank of bank A or B to charge the SV bank;
charging the depleted bank by a power supply as the other bank of bank A and B charges the SV bank; and
repeating the switching and charging process between the two banks for a defined deployment period.

2. The method of claim 1 wherein the capacitors of each bank of the HV bank comprise supercapacitors having a capacitance on the order of 1 to 10 MegaJoules each.

3. The method of claim 1 wherein the SV bank comprises supercapacitors having a capacitance of on the order of 1 to 10 MegaJoules each.

4. The method of claim 1 wherein the multifilar inductor comprises a bifilar toroidal inductor having three windings of copper wire wrapped around a ferrite toroidal shaped core.

5. The method of claim 4 wherein the inductor comprises a gap of a defined distance formed into the toroidal shaped core.

6. The method of claim 4 wherein the supervisory control circuit includes a pulse generator to synchronize the control of the switching circuitry between the HV capacitor bank and the SV capacitor bank.

7. The method of claim 6 wherein the switching circuit switches connections between the windings, and wherein one winding is shorted through a snubber circuit in a defined connection configuration.

8. The method of claim 6 wherein the pulse generator synchronizes and triggers charging of the SV bank based on defined threshold voltages for the depletion and charge levels of the HV banks A and B, and SV bank, and wherein the charging of the SV bank is triggered in response to one-voltage steps over a range of 115V to 120V of the SV bank.

9. The method of claim 1 wherein the power supply comprises a generator set (genset) including a generator and internal combustion engine powered by one of: diesel, petrol, propane or natural gas.

10. The method of claim 1 wherein the switching circuit comprises four switches (S1, S2, S3, and S4) and wherein S1 couples the inductor to the HV bank, S2 and S3 switch between two sections for each respective bank A and B, and S4 switches between bank A or B of the HV bank for an alternating bank switching process.

11. A system comprising:
high voltage (HV) bank section using capacitors arranged into two banks A and B;
a transmission section coupling the HV bank to a capacitor-based service voltage (SV) bank section and a load through a multifilar inductor;
a charging circuit charging the SV bank from a more fully charged bank of bank A or B until the charging bank is depleted;
a switching circuit switching, upon depletion of the charging bank, from the depleted bank to the other bank of bank A or B to charge the SV bank through pulse power, the charging circuit then charging the depleted bank by a power supply as the other bank of bank A and B charges the SV bank; and
a supervisory control circuit disposed between the HV bank and SV bank and controlling the switching circuit to repeat the switching and charging process between the two banks for a defined deployment period.

12. The system of claim 11 wherein the capacitors of at least one of each bank of the HV bank and the SV bank comprise supercapacitors having a capacitance on the order of 1 to 10 MegaJoules each.

13. The system of claim 11 wherein the multifilar inductor comprises a bifilar toroidal inductor having two windings of copper wire wrapped around a ferrite toroidal shaped core.

14. The system of claim 13 wherein the inductor comprises a gap of a defined distance formed into the toroidal shaped core.

15. The system of claim 13 wherein the switching circuit switches connections between the windings, and wherein one winding is shorted through a snubber circuit in a defined connection configuration.

16. The system of claim 15 wherein the switching circuit switches assignments between the windings to be between either a service voltage bank charging period, or a period between power pulses of the pulse power.

17. The system of claim 11 wherein the power supply comprises a generator set (genset) including a generator and internal combustion engine powered by one of: diesel, petrol, propane or natural gas.

18. The system of claim 11 wherein the switching circuit comprises four switches (S1, S2, S3, and S4) and wherein S1 couples the inductor to the HV bank, S2 and S3 switch between two sections for each respective bank A and B, and S4 switches between bank A or B of the HV bank for an alternating bank switching process.

19. The system of claim 18 further comprising a pulse generator synchronizing and triggering charging of the SV bank based on defined threshold voltages for the depletion and charge levels of the HV banks A and B, and SV bank, and wherein the charging of the SV bank is triggered in response to one-voltage steps over a range of 115V to 120V of the SV bank.

20. The system of claim 19 further comprising a load comprising at least part of an electric vehicle charging station.

* * * * *